US010836944B1

(12) United States Patent
Minor et al.

(10) Patent No.: US 10,836,944 B1
(45) Date of Patent: Nov. 17, 2020

(54) REFRIGERANT MIXTURES COMPRISING DIFLUOROMETHANE, PENTAFLUOROETHANE, TETRAFLUOROETHANE, TETRAFLUOROPROPENE, AND CARBON DIOXIDE AND USES THEREOF

(71) Applicant: THE CHEMOURS COMPANY FC, LLC, Wilmington, DE (US)

(72) Inventors: Barbara Haviland Minor, Elkton, MD (US); Joshua Hughes, Wilmington, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 0 days.

(21) Appl. No.: 16/941,700

(22) Filed: Jul. 29, 2020

Related U.S. Application Data

(63) Continuation-in-part of application No. 16/080,090, filed as application No. PCT/US2017/019649 on Feb. 27, 2017.

(60) Provisional application No. 62/301,193, filed on Feb. 29, 2016, provisional application No. 62/339,427, filed on May 20, 2016.

(51) Int. Cl.
*C09K 5/04* (2006.01)

(52) U.S. Cl.
CPC ........ *C09K 5/045* (2013.01); *C09K 2205/106* (2013.01); *C09K 2205/122* (2013.01); *C09K 2205/126* (2013.01); *C09K 2205/43* (2013.01)

(58) Field of Classification Search
None
See application file for complete search history.

(56) References Cited

U.S. PATENT DOCUMENTS

| 5,744,052 A | 4/1998 | Bivens | |
| 2006/0243945 A1* | 11/2006 | Minor | C10M 171/008 |
| | | | 252/67 |
| 2007/0284555 A1 | 12/2007 | Leck et al. | |
| 2009/0314015 A1* | 12/2009 | Minor | C09K 5/045 |
| | | | 62/115 |
| 2010/0122545 A1* | 5/2010 | Minor | C10M 107/34 |
| | | | 62/324.1 |
| 2011/0204279 A1* | 8/2011 | Minor | C08J 9/146 |
| | | | 252/68 |
| 2011/0258147 A1* | 10/2011 | Low | C11D 7/5018 |
| | | | 705/500 |
| 2012/0126187 A1 | 5/2012 | Low | |
| 2013/0096218 A1 | 4/2013 | Rached et al. | |
| 2013/0119299 A1* | 5/2013 | Low | B01D 11/0288 |
| | | | 252/68 |
| 2013/0126776 A1 | 5/2013 | Low | |
| 2013/0126777 A1 | 5/2013 | Low | |
| 2013/0126778 A1* | 5/2013 | Low | C08J 9/122 |
| | | | 252/68 |
| 2014/0222699 A1 | 8/2014 | Low | |
| 2014/0331697 A1 | 11/2014 | Minor et al. | |
| 2015/0033770 A1 | 2/2015 | Minor | |
| 2015/0315446 A1 | 11/2015 | Yana Motta et al. | |
| 2020/0165500 A1 | 5/2020 | Minor et al. | |

FOREIGN PATENT DOCUMENTS

| WO | 2005/108523 A1 | 11/2005 |
| WO | 2019/208722 A1 | 10/2019 |

OTHER PUBLICATIONS

PCT International Search Report and Written Opinion (PCT/US2017/019649) dated Feb. 27, 2017.
Intergovernmental Panel on Climate Change (IPCC) Fourth Assessment Report, Working Group I, 2007.

* cited by examiner

*Primary Examiner* — Joseph D Anthony
(74) *Attorney, Agent, or Firm* — N. Lynn Tucker

(57) ABSTRACT

In accordance with the present invention refrigerant compositions are disclosed. The compositions comprise HFC-32, HFC-125, HFO-1234yf, HFC-134a, and $CO_2$. The refrigerant compositions are useful in processes to produce cooling and heating, in methods for replacing refrigerant R-R-22, and in refrigeration, air conditioning or heat pump systems. These inventive compositions are non-flammable and match cooling performance for R-22. The compositions as described herein have unexpected flammability properties.

15 Claims, No Drawings

REFRIGERANT MIXTURES COMPRISING DIFLUOROMETHANE, PENTAFLUOROETHANE, TETRAFLUOROETHANE, TETRAFLUOROPROPENE, AND CARBON DIOXIDE AND USES THEREOF

BACKGROUND

1. Field of the Disclosure

The present disclosure relates to compositions for use in refrigeration, air conditioning or heat pump systems. The compositions of the present invention are useful in methods for producing cooling and heating, and methods for replacing refrigerants and refrigeration, air conditioning and heat pump apparatus.

2. Description of Related Art

The refrigeration industry has been working for the past few decades to find replacement refrigerants for the ozone-depleting chlorofluorocarbons (CFCs) and hydrochlorofluorocarbons (HCFCs) being phased out as a result of the Montreal Protocol. The solution for most refrigerant producers has been the commercialization of hydrofluorocarbon (HFC) refrigerants. These HFC refrigerants, including HFC-134a, R-404A and R-410A, among others, being the most widely used at this time, have zero ozone depletion potential and thus are not affected by the current regulatory phase out as a result of the Montreal Protocol.

Environmental regulations relating to global warming are now causing the global phase out of many HFC refrigerants. The mobile air conditioning market has been dealing with the earliest regulations relating to global warming potential (GWP). As the regulations are applied to other industry segments, for instance for stationary air conditioning and refrigeration systems, an even greater need has arisen for refrigerants that can be used in all areas of the refrigeration and air-conditioning industry.

The industry has struggled over the past decades, particularly, to find a replacement for R-22 and R-410A that provides performance equivalent to R-22 and/or R-410A and is non-flammable. Additionally, a composition for replacing R-22, that is non-flammable and has GWP less than 1000 is needed.

Additionally, the industry needs a replacement for R-407A, R-407C, and R-407F in refrigeration and/or air conditioning that provides performance equivalent to R-407A, R-407C, and/or R-407F and is non-flammable.

BRIEF SUMMARY

Certain compositions comprising difluoromethane, pentafluoroethane, tetrafluoroethane, tetrafluoropropene and carbon dioxide have been found to possess suitable properties to allow their use as replacements for currently available commercial refrigerants, in particular R-22, R-410A, R-407A, R-407C, and R-407F, with high GWP. Therefore, the present inventors have discovered refrigerant gases that are non-ozone depleting, and have significantly less direct global warming potential, are non-flammable and match the performance of R-22, R-410A, R-407A, R-407C, and R-407F, and are thus environmentally sustainable alternatives.

Additionally, the use of $CO_2$ as a blend component allows an increase in difluoromethane in a mixture while maintaining non-flammability, a requirement for many refrigerant applications.

In accordance with the present invention refrigerant compositions are disclosed. The refrigerant compositions comprise difluoromethane, pentafluoroethane, tetrafluoroethane, tetrafluoropropene and carbon dioxide. In particular, the compositions comprise a refrigerant consisting essentially of from about 13 to 15 weight percent difluoromethane, about 10 to 12 weight percent pentafluoroethane, about 36 to 38 weight percent 2,3,3,3-tetrafluoropropene, about 34 to 37 weight percent 1,1,1,2-tetrafluoroethane, and about 1 to 3 weight percent carbon dioxide.

The refrigerant compositions are useful as components in compositions also containing non-refrigerant components (e.g., lubricants), in processes to produce cooling, in methods for replacing refrigerant R-22, R-410A, R-404A, R-407A, R-407C, or R-407F, and, in particular, in refrigeration, air conditioning and heat pump systems.

DETAILED DESCRIPTION

Before addressing details of embodiments described below, some terms are defined or clarified.

Definitions

As used herein, the term heat transfer fluid (also referred to as heat transfer medium) means a composition used to carry heat from a heat source to a heat sink.

A heat source is defined as any space, location, object or body from which it is desirable to add, transfer, move or remove heat. Examples of heat sources are spaces (open or enclosed) requiring refrigeration or cooling, such as refrigerator or freezer cases in a supermarket, transport refrigerated containers, building spaces requiring air conditioning, industrial water chillers or the passenger compartment of an automobile requiring air conditioning. In some embodiments, the heat transfer composition may remain in a constant state throughout the transfer process (i.e., not evaporate or condense). In other embodiments, evaporative cooling processes may utilize heat transfer compositions as well.

A heat sink is defined as any space, location, object or body capable of absorbing heat. A vapor compression refrigeration system is one example of such a heat sink.

A refrigerant is defined as a heat transfer fluid that undergoes a phase change from liquid to gas and back again during a cycle used to transfer of heat.

A heat transfer system is the system (or apparatus) used to produce a heating or cooling effect in a particular space. A heat transfer system may be a mobile system or a stationary system.

Examples of heat transfer systems are any type of refrigeration systems and air conditioning systems including, but are not limited to, stationary heat transfer systems, air conditioners, freezers, refrigerators, heat pumps, water chillers, flooded evaporator chillers, direct expansion chillers, walk-in coolers, mobile refrigerators, mobile heat transfer systems, mobile air conditioning units, dehumidifiers, and combinations thereof.

Refrigeration capacity (also referred to as cooling capacity) is a term which defines the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher is the energy efficiency. COP is directly related to the energy efficiency ratio (EER) that is the efficiency rating for refrigeration or air conditioning equipment at a specific set of internal and external temperatures.

The term "subcooling" refers to the reduction of the temperature of a liquid below that liquid's saturation point for a given pressure. The saturation point is the temperature at which the vapor is completely condensed to a liquid, but subcooling continues to cool the liquid to a lower temperature liquid at the given pressure. By cooling a liquid below the saturation temperature (or bubble point temperature), the net refrigeration capacity can be increased. Subcooling thereby improves refrigeration capacity and energy efficiency of a system. Subcool amount is the amount of cooling below the saturation temperature (in degrees).

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition. When referring to the temperature glide of a refrigeration, air conditioning or heat pump system, it is common to provide the average temperature glide being the average of the temperature glide in the evaporator and the temperature glide in the condenser.

The net refrigeration effect is the quantity of heat that each kilogram of refrigerant absorbs in the evaporator to produce useful cooling.

The mass flow rate is the quantity of refrigerant in kilograms circulating through the refrigeration, heat pump or air conditioning system over a given period of time.

As used herein, the term "lubricant" means any material added to a composition or a compressor (and in contact with any heat transfer composition in use within any heat transfer system) that provides lubrication to the compressor to aid in preventing parts from seizing.

As used herein, compatibilizers are compounds which improve solubility of the hydrofluorocarbon of the disclosed compositions in heat transfer system lubricants. In some embodiments, the compatibilizers improve oil return to the compressor. In some embodiments, the composition is used with a system lubricant to reduce oil-rich phase viscosity.

As used herein, oil-return refers to the ability of a heat transfer composition to carry lubricant through a heat transfer system and return it to the compressor. That is, in use, it is not uncommon for some portion of the compressor lubricant to be carried away by the heat transfer composition from the compressor into the other portions of the system. In such systems, if the lubricant is not efficiently returned to the compressor, the compressor will eventually fail due to lack of lubrication.

As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681. The upper flammability limit ("UFL") is the maximum concentration of the heat transfer composition in air that is capable of propagating a flame through a homogeneous mixture of the composition and air under the same test conditions. Determination of whether a refrigerant compound or mixture is flammable, or non-flammable, is also done by testing under the conditions of ASTM-681.

During a refrigerant leak, lower boiling components of a mixture may leak preferentially. Thus, the composition in the system, as well as, the vapor leaking can vary over the time period of the leak. Thus, a non-flammable mixture may become flammable under leakage scenarios. And in order to be classified as non-flammable by ASHRAE (American Society of Heating, Refrigeration and Air-conditioning Engineers), a refrigerant or heat transfer composition must be non-flammable as formulated, but also under leakage conditions.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced. For mixtures, a weighted average can be calculated based on the individual GWPs for each component.

Ozone depletion potential (ODP) is a number that refers to the amount of ozone depletion caused by a substance. The ODP is the ratio of the impact on ozone of a chemical compared to the impact of a similar mass of CFC-11 (fluorotrichloromethane). Thus, the ODP of CFC-11 is defined to be 1.0. Other CFCs and HCFCs have ODPs that range from 0.01 to 1.0. HFCs have zero ODP because they do not contain chlorine or other ozone depleting halogens.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus.

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause, other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do not materially affect the basic and novel characteristic(s) of the claimed invention. The term 'consisting essentially of' occupies a middle ground between "comprising" and 'consisting of'. Typically, components of the refrigerant mixtures and the refrigerant mixtures themselves can contain minor amounts (e.g., less than about 0.5 weight percent total) of impurities and/or byproducts (e.g., from the manufacture of the refrigerant components or reclamation of the refrigerant components from other systems) which do not materially affect the novel and basic characteristics of the refrigerant mixture.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

2,3,3,3-tetrafluoropropene may also be referred to as HFO-1234yf, HFC-1234yf, or R1234yf. HFO-1234yf may be made by methods known in the art, such as by dehydrofluorination 1,1,1,2,3-pentafluoropropane (HFC-245eb) or 1,1,1,2,2-pentafluoropropane (HFC-245cb).

Difluoromethane (HFC-32 or R-32) is commercially available or may be made by methods known in the art, such as by dechlorofluorination of methylene chloride.

Pentafluoroethane (HFC-125 or R125) is commercially available or may be made by methods known in the art, such as dechlorofluorination of 2,2-dichloro-1,1,1-trifluoroethane as described in U.S. Pat. No. 5,399,549, incorporated herein by reference.

1,1,1,2-tetrafluoroethane (HFC-134a or R134a) is commercially available or may be made by methods know in the art, such as by the hydrogenation of 1,1-dichloro-1,2,2,2-tetrafluoroethane (i.e., $CCl_2FCF_3$ or CFC-114a) to 1,1,1,2-tetrafluoroethane.

Carbon dioxide ($CO_2$) is commercially available from many gas supply houses or may be produced by any of numerous well known methods.

Compositions

The refrigerants industry has struggled to develop new refrigerant products that provide acceptable performance and environmental sustainability. Many applications require non-flammable refrigerant compositions and new global warming regulations may place a cap on global warming potential (GWP) for new refrigerant compositions. Thus, the industry must find non-flammable, low GWP (how low is still in question), low-toxicity, low ozone depletion potential (ODP) compositions that also provide good performance for cooling and heating. The industry has searched for decades to find a non-flammable replacement for R-22. R-410A (a non-flammable blend of 50 weight percent HFC-32 and 50 weight percent HFC-125) has been used in air conditioning and heat pumps for many years as an alternative for R-22, but it too has high GWP and must be replaced. The compositions as described herein provide such a replacement and have unexpected flammability properties.

Difluoromethane (HFC-32) has been found to have desirable properties for a refrigerant or heat transfer composition. It is mildly flammable, though, and therefore, if a refrigerant or heat transfer composition is required to be non-flammable for a particular application, mixtures containing HFC-32 must be formulated carefully to ensure non-flammability. The present inventors have surprisingly found that addition of even a small amount of carbon dioxide ($CO_2$) to a composition can affect the flammability in a positive way, such that a higher amount of HFC-32 can be used and still maintain a non-flammable composition. The leakage behavior of these compositions is demonstrated in the examples of the present application.

The present inventors have identified non-flammable compositions that provide performance properties to serve as replacements for R-22 and R-410A in refrigeration, air conditioning and heat pump apparatus. These compositions comprise difluoromethane, pentafluoroethane, 2,3,3,3-tetrafluoropropene, 1,1,1,2-tetrafluoroethane, and carbon dioxide. In one embodiment, these compositions are non-flammable. Thus, is provided a non-flammable composition comprising difluoromethane, pentafluoroethane, 2,3,3,3-tetrafluoropropene, 1,1,1,2-tetrafluoroethane, and carbon dioxide. In one embodiment the compositions are non-flammable when tested under conditions of ASTM E-681. In one embodiment the compositions are non-flammable when tested under conditions of ASTM-E-681 at 60° C.

Additionally, further non-flammable compositions have been found that provide performance that allows replacement of R-407A, R-407C, and/or R-407F. These compositions also comprise difluoromethane, pentafluoroethane, 2,3,3,3-tetrafluoropropene, 1,1,1,2-tetrafluoroethane, and carbon dioxide.

Additionally, the non-flammable compositions of the present invention have been found to provide performance that allows replacement of R-404A, and/or R-507A. These compositions also comprise difluoromethane, pentafluoroethane, 2,3,3,3-tetrafluoropropene, 1,1,1,2-tetrafluoroethane, and carbon dioxide.

Disclosed herein are compositions that in one embodiment comprise 9 to 26 weight percent difluoromethane (HFC-32), about 11 to 26 weight percent pentafluoroethane (HFC-125), about 23 to 46 weight percent 2,3,3,3-tetrafluoropropene (HFO-1234yf), about 22 to 35 weight percent 1,1,1,2-tetrafluoroethane (HFC-134a), and about 2 to 10 weight percent carbon dioxide ($CO_2$). These compositions provide volumetric capacity that matches that for chlorodifluoromethane (R-22) within about +15%. In another embodiment, the compositions comprising about 10 to 24 weight percent HFC-32, about 12 to 24 weight percent HFC-125, about 25 to 46 weight percent HFO-1234yf, about 24 to 30 weight percent HFC-134a, and about 2 to 8 weight percent $CO_2$. These compositions provide volumetric capacity that matches that for R-22 within about ±10%.

Of particular interest, as replacements for R-22, are those listed in Table A.

TABLE A

R32/R125/R1234yf/ R134a/$CO_2$ (wt %)

10.8/12.7/45.1/29.4/2.0
13.7/13.7/36.3/34.3/2.0
10.6/12.5/44.2/28.8/4.0
13.4/13.4/35.5/33.6/4.0
10.3/12.2/43.2/28.2/6.0
13.3/13.3/35.2/33.3/5.0
19.6/19.6/30.4/28.4/2.0
20/20/30/28/2.0
13.2/13.2/34.8/32.9/6.0
10.1/12.0/42.3/27.6/8.0
20/20/29.5/27.6/3.0
22/22/27.9/26.1/2.0
19.2/19.2/29.8/27.8/4.0
12.9/12.9/34/32.2/8.0
20/20/28.9/27.1/4.0
22/22/27.4/25.6/3.0
24/24/25.8/24.2/2.0
9.9/11.7/41.4/27/10
20/20/28.4/26.6/5.0
22/22/26.9/25.1/4.0
24/24/25.3/23.7/3.0
26/26/23.8/22.2/2.0
18.8/18.8/29.1/27.3/6.0
7.0/6.0/46/34/7.0
11/8.0/36/27/18

In another embodiment, of particular interest as replacements for R-22, are compositions comprising a refrigerant consisting essentially of from about 13 to 15 weight percent difluoromethane, about 10 to 12 weight percent pentafluoroethane, about 36 to 38 weight percent 2,3,3,3-tetrafluoropropene, about 34 to 37 weight percent 1,1,1,2-tetrafluoroethane, and about 1 to 3 weight percent carbon dioxide. Alternatively, in another embodiment, the compositions may comprise a refrigerant consisting of from about 13 to 15 weight percent difluoromethane, about 10 to 12 weight percent pentafluoroethane, about 36 to 38 weight percent 2,3,3,3-tetrafluoropropene, about 34 to 37 weight percent 1,1,1,2-tetrafluoroethane, and about 1 to 3 weight percent carbon dioxide. All these compositions are estimated to be non-flammable.

In another embodiment, the compositions comprise a refrigerant consisting essentially of about 14 weight percent difluoromethane, about 11 weight percent pentafluoroethane, about 37 weight percent 2,3,3,3-tetrafluoropropene, about 36 weight percent 1,1,1,2-tetrafluoroethane, and about 2 weight percent carbon dioxide.

In another embodiment, the compositions comprise a refrigerant consisting essentially of about 14 weight percent difluoromethane, about 11.5 weight percent pentafluoroethane, about 37.5 weight percent 2,3,3,3-tetrafluoropropene, about 35 weight percent 1,1,1,2-tetrafluoroethane, and about 2 weight percent carbon dioxide.

In another embodiment, disclosed are compositions comprise 8 to 40 weight percent difluoromethane (HFC-32), about 10 to 40 weight percent pentafluoroethane (HFC-125), about 7 to 40 weight percent 2,3,3,3-tetrafluoropropene (HFO-1234yf), about 6 to 27 weight percent 1,1,1,2-tetrafluoroethane (HFC-134a), and about 2 to 20 weight percent carbon dioxide ($CO_2$). In another embodiment, the compositions comprising about 18 to 40 weight percent HFC-32, about 18 to 40 weight percent HFC-125, about 7 to 28 weight percent HFO-1234yf, about 6 to 27 weight percent HFC-134a, and about 2 to 10 weight percent $CO_2$. These compositions provide volumetric capacity that matches that for R-410A within about +15%.

In another embodiment, the compositions comprising about 8 to 40 weight percent HFC-32, about 10 to 40 weight percent HFC-125, about 7 to 39 weight percent HFO-1234yf, about 6 to 26 weight percent HFC-134a, and about 2 to 20 weight percent $CO_2$. In another embodiment, the compositions comprising about 22 to 40 weight percent HFC-32, about 22 to 40 weight percent HFC-125, about 7 to 24 weight percent HFO-1234yf, about 6 to 23 weight percent HFC-134a, and about 2 to 10 weight percent $CO_2$. These compositions provide volumetric capacity that matches that for R-410A within about +10%.

In another embodiment, the compositions comprising about 28 to 38 weight percent HFC-32, about 28 to 32 weight percent HFC-125, about 12 to 19 weight percent HFO-1234yf, about 12 to 19 weight percent HFC-134a, and about 3 to 8 weight percent $CO_2$. In one embodiment, these compositions are particularly useful for replacing R-410A in refrigeration, air conditioning and heat pump systems, including medium temperature refrigeration systems and low temperature refrigeration systems.

Of particular interest as replacements for R-410A are those listed in Table B.

TABLE B

R32/R125/R1234yf/ R134a/$CO_2$ (wt %)

32/32/17.6/16.4/2.0
34/34/15.5/14.5/2.0
36/36/13.4/12.6/2.0
38/38/11.4/10.6/2.0
40/40/09.3/08.7/2.0
30/30/19.1/17.9/3.0
32/32/17.1/16.0/3.0
34/34/15.0/14.0/3.0
36/36/12.9/12.1/3.0
38/38/10.9/10.2/3.0
40/40/8.8/8.2/3.0
28/28/20.7/19.3/4.0
30/30/18.6/17.4/4.0
32/32/16.5/15.5/4.0
34/34/14.5/13.5/4.0
36/36/12.4/11.6/4.0
38/38/10.3/9.7/4.0
26/26/22.2/20.8/5.0
28/28/20.2/18.9/05
30/30/18.1/16.9/5.0
32/32/16.0/15.0/5.0
34/34/14.0/13.1/5.0
36/36/11.9/11.1/5.0
38/38/9.8/9.2/05,0
24/24/23.8/22.2/6.0
26/26/21.7/20.3/6.0
28/28/19.6/18.4/6.0
30/30/17.6/16.4/6.0
32/32/15.5/14.5/6.0
34/34/13.4/12.6/6.0
29.6/29.9/17/17.5/6.0
36/36/11.4/10.6/6.0
38/38/9.3/8.7/6.0
22/22/24.8/23.2/8.0
24/24/22.7/21.3/8.0
26/26/20.7/19.3/8.0
28/28/18.6/17.4/8.0
30/30/16.5/15.5/8.0
32/32/14.5/13.5/8.0
34/34/12.4/11.6/8.0
36/36/10.3/9.7/8.0
38/38/8.3/7.7/8.0
18/18/27.9/26.1/10
20/20/25.8/24.2/10
22/22/23.8/22.2/10

TABLE B-continued

R32/R125/R1234yf/ R134a/CO$_2$ (wt %)

24/24/21.7/20.3/10
26/26/19.6/18.4/10
28/28/17.6/16.4/10
30/30/15.5/14.5/10
32/32/13.4/12.6/10
34/34/11.4/10.6/10
36/36/9.3/8.7/10
38/38/7.2/6.8/10
17.6/17.6/27.3/25.5/12
9.5/9.5/39.6/25.8/14
17.2/17.2/26.7/24.9/14
9.2/9.2/38.6/25.2/16
16.8/16.8/26.0/24.4/16
9.0/10.7/37.7/24.6/18
16.4/16.4/25.4/23.8/18
8.8/10.4/36.8/24.0/20
16/16/24.8/23.2/20
29.6/29.9/17/17.5/6.0
36/30/14/14/6.0
10.8/12.7/45.1/29.4/2.0
13.7/13.7/36.3/34.3/2.0
10.6/12.5/44.2/28.8/4.0
13.4/13.4/35.5/33.6/4.0
10.3/12.2/43.2/28.2/6.0
13.3/13.3/35.2/33.3/5.0
19.6/19.6/30.4/28.4/2.0
20/20/30/28/2.0
13.2/13.2/34.8/32.9/6.0
10.1/12.0/42.3/27.6/8.0
20/20/29.5/27.6/3.0
22/22/27.9/26.1/2.0
19.2/19.2/29.8/27.8/4.0
12.9/12.9/34/32.2/8.0
20/20/28.9/27.1/4.0
22/22/27.4/25.6/3.0
24/24/25.8/24.2/2.0
9.9/11.7/41.4/27/10
20/20/28.4/26.6/5.0
22/22/26.9/25.1/4.0
24/24/25.3/23.7/3.0
26/26/23.8/22.2/2.0
18.8/18.8/29.1/27.3/6.0
7.0/6.0/46/34/7.0
11/8.0/36/27/18

In another embodiment, disclosed herein are compositions that can serve as replacements for R-407A, R-407C, or R-407F. In one embodiment, the compositions for replacing R-407A, R-407C, or R-407F comprise 9 to 26 weight percent difluoromethane (HFC-32), about 11 to 26 weight percent pentafluoroethane (HFC-125), about 23 to 46 weight percent 2,3,3,3-tetrafluoropropene (HFO-1234yf), about 22 to 35 weight percent 1,1,1,2-tetrafluoroethane (HFC-134a), and about 2 to 10 weight percent carbon dioxide (CO$_2$). In another embodiment, the compositions for replacing R-407A, R-407C, or R-407F comprise about 10 to 24 weight percent HFC-32, about 12 to 24 weight percent HFC-125, about 25 to 46 weight percent HFO-1234yf, about 24 to 30 weight percent HFC-134a, and about 2 to 8 weight percent CO$_2$.

Of particular interest as replacements for replacing R-407A, R-407C, or R-407F are those listed in Table C.

TABLE C

R32/R125/R1234yf/ R134a/CO$_2$ (wt %)

10.8/12.7/45.1/29.4/2.0
13.7/13.7/36.3/34.3/2.0
10.6/12.5/44.2/28.8/4.0
13.4/13.4/35.5/33.6/4.0
10.3/12.2/43.2/28.2/6.0

TABLE C-continued

R32/R125/R1234yf/ R134a/CO$_2$ (wt %)

13.3/13.3/35.2/33.3/5.0
19.6/19.6/30.4/28.4/2.0
20/20/30/28/2.0
13.2/13.2/34.8/32.9/6.0
10.1/12.0/42.3/27.6/8.0
20/20/29.5/27.6/3.0
22/22/27.9/26.1/2.0
19.2/19.2/29.8/27.8/4.0
12.9/12.9/34/32.2/8.0
20/20/28.9/27.1/4.0
22/22/27.4/25.6/3.0
24/24/25.8/24.2/2.0
9.9/11.7/41.4/27/10
20/20/28.4/26.6/5.0
22/22/26.9/25.1/4.0
24/24/25.3/23.7/3.0
26/26/23.8/22.2/2.0
18.8/18.8/29.1/27.3/6.0
7.0/6.0/46/34/7.0
11/8.0/36/27/18

Additionally, compositions that are shown above as replacements for R-22 may serve as replacements for R-404A or R-507 (which means, R-507A or R-507B).

In another embodiment, the compositions of the present invention may comprise from about 6 to 26 weight percent difluoromethane, from about 6 to 26 weight percent pentafluoroethane, from about 23 to 46 weight percent 2,3,3,3-tetrafluoropropene, from about 22 to 35 weight percent 1,1,1,2-tetrafluoroethane, and from about 2 to 10 weight percent carbon dioxide.

In another embodiment, the compositions of the present invention may comprise from about 4 to 26 weight percent difluoromethane, about 2 to 26 weight percent pentafluoroethane, about 23 to 50 weight percent 2,3,3,3-tetrafluoropropene, about 22 to 38 weight percent 1,1,1,2-tetrafluoroethane, and about 2 to 10 weight percent carbon dioxide.

In another embodiment, the compositions of the present invention may comprise from about 6 to 40 weight percent difluoromethane, from about 8 to 40 weight percent pentafluoroethane, from about 7 to 40 weight percent 2,3,3,3-tetrafluoropropene, from about 6 to 27 weight percent 1,1,1,2-tetrafluoroethane, and from about 2 to 20 weight percent carbon dioxide.

In another embodiment, the compositions of the present invention may comprise from about 4 to 40 weight percent difluoromethane, from about 6 to 40 weight percent pentafluoroethane, from about 7 to 40 weight percent 2,3,3,3-tetrafluoropropene, from about 6 to 30 weight percent 1,1,1,2-tetrafluoroethane, and from about 2 to 20 weight percent carbon dioxide.

In some embodiments, in addition to the difluoromethane, pentafluoroethane, 2,3,3,3-tetrafluoropropene, 1,1,1,2-tetrafluoroethane, and carbon dioxide, the disclosed compositions may comprise optional non-refrigerant components.

In some embodiments, the optional non-refrigerant components (also referred to herein as additives) in the compositions disclosed herein may comprise one or more components selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional non-refrigerant components fit into one or more of these categories and may have qualities that lend themselves to achieve one or more performance characteristic.

In some embodiments, one or more non-refrigerant components are present in small amounts relative to the overall composition. In some embodiments, the amount of additive(s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 5 weight percent of the total composition or in an amount between about 0.1 weight percent to about 3.5 weight percent. The additive component(s) selected for the disclosed composition is selected on the basis of the utility and/or individual equipment components or the system requirements.

In one embodiment, the lubricant is selected from the group consisting of mineral oil, alkylbenzene, polyol esters, polyalkylene glycols, polyvinyl ethers, polycarbonates, perfluoropolyethers, silicones, silicate esters, phosphate esters, paraffins, naphthenes, polyalpha-olefins, and combinations thereof.

The lubricants as disclosed herein may be commercially available lubricants. For instance, the lubricant may be paraffinic mineral oil, sold by BVA Oils as BVM 100 N, naphthenic mineral oils sold by Crompton Co. under the trademarks Suniso®1GS, Suniso® 3GS and Suniso® 5GS, naphthenic mineral oil sold by Pennzoil under the trademark Sontex® 372LT, naphthenic mineral oil sold by Calumet Lubricants under the trademark Calumet® RO-30, linear alkylbenzenes sold by Shrieve Chemicals under the trademarks Zerol® 75, Zerol® 150 and Zerol® 500 and branched alkylbenzene sold by Nippon Oil as HAB 22, polyol esters (POEs) sold under the trademark Castrol®100 by Castrol, United Kingdom, polyalkylene glycols (PAGs) such as RL-488A from Dow (Dow Chemical, Midland, Mich.), and mixtures thereof, meaning mixtures of any of the lubricants disclosed in this paragraph.

In the compositions of the present invention including a lubricant, the lubricant is present in an amount of less than 40.0 weight percent to the total composition. In other embodiments, the amount of lubricant is less than 20 weight percent of the total composition. In other embodiments, the amount of lubricant is less than 10 weight percent of the total composition. In other embodiments, the about of lubricant is between about 0.1 and 5.0 weight percent of the total composition.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning and heat pump systems, lubricants may be charged in the compressor and/or the compressor lubricant sump. Such lubricant would be in addition to any lubricant additive present in the refrigerant in such a system. In use, the refrigerant composition when in the compressor may pick up an amount of the equipment lubricant to change the refrigerant-lubricant composition from the starting ratio.

The non-refrigerant component used with the compositions of the present invention may include at least one dye. The dye may be at least one ultra-violet (UV) dye. The UV dye may be a fluorescent dye. The fluorescent dye may be selected from the group consisting of naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph.

In some embodiments, the disclosed compositions contain from about 0.001 weight percent to about 1.0 weight percent UV dye. In other embodiments, the UV dye is present in an amount of from about 0.005 weight percent to about 0.5 weight percent, and in other embodiments, the UV dye is present in an amount of from 0.01 weight percent to about 0.25 weight percent of the total composition.

UV dye is a useful component for detecting leaks of the composition by permitting one to observe the fluorescence of the dye at or in the vicinity of a leak point in an apparatus (e.g., refrigeration unit, air-conditioner or heat pump). The UV emission, e.g., fluorescence from the dye may be observed under an ultra-violet light. Therefore, if a composition containing such a UV dye is leaking from a given point in an apparatus, the fluorescence can be detected at the leak point, or in the vicinity of the leak point.

Another non-refrigerant component which may be used with the compositions of the present invention may include at least one solubilizing agent selected to improve the solubility of one or more dye in the disclosed compositions. In some embodiments, the weight ratio of dye to solubilizing agent ranges from about 99:1 to about 1:1. The solubilizing agents include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers and 1,1,1-trifluoroalkanes and mixtures thereof, meaning mixtures of any of the solubilizing agents disclosed in this paragraph.

In some embodiments, the non-refrigerant component comprises at least one compatibilizer to improve the compatibility of one or more lubricants with the disclosed compositions. The compatibilizer may be selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph.

The solubilizing agent and/or compatibilizer may be selected from the group consisting of hydrocarbon ethers consisting of the ethers containing only carbon, hydrogen and oxygen, such as dimethyl ether (DME) and mixtures thereof, meaning mixtures of any of the hydrocarbon ethers disclosed in this paragraph.

The compatibilizer may be linear or cyclic aliphatic or aromatic hydrocarbon compatibilizer containing from 3 to 15 carbon atoms. The compatibilizer may be at least one hydrocarbon, which may be selected from the group consisting of at least propanes, including propylene and propane, butanes, including n-butane and isobutene, pentanes, including n-pentane, isopentane, neopentane and cyclopentane, hexanes, octanes, nonane, and decanes, among others. Commercially available hydrocarbon compatibilizers include but are not limited to those from Exxon Chemical (USA) sold under the trademarks Isopar® H, a mixture of undecane ($C_{11}$) and dodecane ($C_{12}$) (a high purity $C_{11}$ to $C_{12}$ iso-paraffinic), Aromatic 150 (a $C_9$ to $C_{11}$ aromatic), Aromatic 200 (a $C_9$ to $C_{15}$ aromatic) and Naptha 140 (a mixture of $C_5$ to $C_{11}$ paraffins, naphthenes and aromatic hydrocarbons) and mixtures thereof, meaning mixtures of any of the hydrocarbons disclosed in this paragraph.

The compatibilizer may alternatively be at least one polymeric compatibilizer. The polymeric compatibilizer may be a random copolymer of fluorinated and non-fluorinated acrylates, wherein the polymer comprises repeating units of at least one monomer represented by the formulae $CH_2=C(R^1)CO_2R^2$, $CH_2=C(R^3)C_6H_4R^4$, and $CH_2=C(R^5)C_6H_4XR^6$, wherein X is oxygen or sulfur; $R^1$, $R^3$, and RS are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours and Company, (Wilmington, Del., 19898, USA) under the trademark Zonyl© PHS. Zonyl® PHS is a random copolymer made by polymerizing 40 weight percent $CH_2=C(CH_3)CO_2CH_2CH_2(CF_2CF_2)_mF$ (also referred to as Zonyl®® fluoromethacrylate or ZFM) wherein m is from 1 to 12, primarily 2 to 8, and 60 weight percent auryl methacrylate ($CH_2=C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

Another non-refrigerant component which may be used with the compositions of the present invention may be a metal surface deactivator. The metal surface deactivator is selected from the group consisting of areoxalyl bis (benzylidene) hydrazide (CAS reg no. 6629-10-3), N,N'-bis(3, 5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof, meaning mixtures of any of the metal surface deactivators disclosed in this paragraph.

The non-refrigerant component used with the compositions of the present invention may alternatively be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof, meaning mixtures of any of the stabilizers disclosed in this paragraph.

The stabilizer may be selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos®168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; triaryl phosphates including triphenyl phosphate, tricresyl phosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad620; isopropylated triphenyl phosphates such as those commercially available under the trademarks Durad® 220 and Durad®110; anisole; 1,4-dimethoxybenzene; 1,4-diethoxybenzene; 1,3,5-trimethoxybenzene; myrcene, alloocimene, limonene (in particular, d-limonene); retinal; pinene; menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bomane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy) methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

The additive used with the compositions of the present invention may alternatively be an ionic liquid stabilizer. The ionic liquid stabilizer may be selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of [BF$_4$]—, [PF$_6$]—, [SbF$_6$]—, [CF$_3$SO$_3$]—, [HCF$_2$CF$_2$SO$_3$]—, [CF$_3$HFCCF$_2$SO$_3$]—, [HCClFCF$_2$SO$_3$]—, [(CF$_3$SO$_2$)$_2$N]—, [(CF$_3$CF$_2$SO$_2$)$_2$N]—, [(CF$_3$SO$_2$)$_3$C]—, [CF$_3$CO$_2$]—, and F— and mixtures thereof. In some embodiments, ionic liquid stabilizers are selected from the group consisting of emim BF$_4$ (1-ethyl-3-methylimidazolium tetrafluoroborate); bmim BF$_4$ (1-butyl-3-methylimidazolium tetraborate); emim PF$_6$ (1-ethyl-3-methylimidazolium hexafluorophosphate); and bmim PF$_6$ (1-butyl-3-methylimidazolium hexafluorophosphate), all of which are available from Fluka (Sigma-Aldrich).

In some embodiments, the stabilizer may be a hindered phenol, which is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tertbutylbenzyl)sulfide; bis(3,5-di-tert-butyl-4-hydroxybenzyl) sulfide and mixtures thereof, meaning mixtures of any of the phenols disclosed in this paragraph.

The non-refrigerant component which is used with compositions of the present invention may alternatively be a tracer. The tracer may be two or more tracer compounds from the same class of compounds or from different classes of compounds. In some embodiments, the tracer is present in the compositions at a total concentration of about 50 parts per million by weight (ppm) to about 1000 ppm, based on the weight of the total composition. In other embodiments, the tracer is present at a total concentration of about 50 ppm to about 500 ppm. Alternatively, the tracer is present at a total concentration of about 100 ppm to about 300 ppm.

The tracer may be selected from the group consisting of hydrofluorocarbons (HFCs), deuterated hydrofluorocarbons, perfluorocarbons, fluoroethers, brominated compounds, iodated compounds, alcohols, aldehydes and ketones, nitrous oxide and combinations thereof. Alternatively, the tracer may be selected from the group consisting of fluoroethane, 1,1,-difluoroethane, 1,1,1-trifluoroethane, 1,1,1,3,3,3-hexafluoropropane, 1,1,1,2,3,3,3-heptafluoropropane, 1,1,1,3,3-pentafluoropropane, 1,1,1,3,3-pentafluorobutane, 1,1,1,2,3,4,4,5,5,5-decafluoropentane, 1,1,1,2,2,3,4,5,5,6,6,7,7,7-tridecafluoroheptane, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide (N$_2$O) and mixtures thereof. In some embodiments, the tracer is a blend containing two or more hydrofluorocarbons, or one hydrofluorocarbon in combination with one or more perfluorocarbons.

The tracer may be added to the compositions of the present invention in predetermined quantities to allow detection of any dilution, contamination or other alteration of the composition.

The additive which may be used with the compositions of the present invention may alternatively be a perfluoropolyether as described in detail in US2007-0284555, incorporated herein by reference.

It will be recognized that certain of the additives referenced above as suitable for the non-refrigerant component have been identified as potential refrigerants. However, in accordance with this invention, when these additives are used, they are not present at an amount that would affect the novel and basic characteristics of the refrigerant mixtures of this invention. Preferably, the refrigerant mixtures and the compositions of this invention containing them, contain no more than about 0.5 weight percent of the refrigerants other than HFC-32, HFC-125, HFO-1234yf, HFC-134a, and CO$_2$.

In one embodiment, the compositions disclosed herein may be prepared by any convenient method to combine the desired amounts of the individual components. A preferred method is to weigh the desired component amounts and thereafter combine the components in an appropriate vessel. Agitation may be used, if desired.

Compositions of the present invention have zero ozone depletion potential and low global warming potential (GWP). Additionally, the compositions of the present invention will have global warming potentials that are less than many hydrofluorocarbon refrigerants currently in use.

Apparatus and Methods of Use

The compositions disclosed herein are useful as heat transfer compositions or refrigerants. In particular, the compositions comprising HFC-32, HFC-125, HFO-1234yf, HFC-134a, and CO$_2$ are useful as refrigerants. Also, the compositions comprising HFC-32, HFC-125, HFO-1234yf, HFC-134a, and CO$_2$ are useful as replacements for R-22 or R-410A in refrigeration, air conditioning or heat pump systems.

Thus, disclosed herein is a method of producing cooling comprising evaporating a composition comprising HFC-32, HFC-125, HFO-1234yf, HFC-134a, and CO$_2$ in the vicinity of a body to be cooled and thereafter condensing said composition.

In another embodiment, disclosed herein is a process for producing heating comprising evaporating a composition comprising HFC-32, HFC-125, HFO-1234yf, HFC-134a, and CO$_2$ and thereafter condensing said composition in the vicinity of a body to be heated.

Vapor-compression refrigeration, air conditioning and heat pump systems include an evaporator, a compressor, a condenser, and an expansion device. A refrigeration cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator, by withdrawing heat from the environment, at a low temperature to form a gas and produce cooling. Often air or a heat transfer fluid flows over or around the evaporator to transfer the cooling effect caused by the evaporation of the refrigerant in the evaporator to a body to be cooled. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

A body to be cooled or heated may be defined as any space, location, object or body for which it is desirable to provide cooling or heating. Examples include spaces (open or enclosed) requiring air conditioning, cooling, or heating, such as a room, an apartment, or building, such as an apartment building, university dormitory, townhouse, or other attached house or single family home, hospitals, office buildings, supermarkets, college or university classrooms or administration buildings and automobile or truck passenger compartments.

By "in the vicinity of" is meant that the evaporator of the system containing the refrigerant composition is located either within or adjacent to the body to be cooled, such that air moving over the evaporator would move into or around the body to be cooled. In the process for producing heating, "in the vicinity of" means that the condenser of the system containing the refrigerant composition is located either within or adjacent to the body to be heated, such that the air moving over the evaporator would move into or around the body to be heated.

A method is provided for replacing R-22 or R-410A in refrigeration, air conditioning or heat pump systems comprising replacing said R-22 or R-410A with a composition comprising HFC-32, HFC-125, HFO-1234yf, HFC-134a, and $CO_2$ to said refrigeration, air conditioning or heat pump system in place of R-22 or R-410A.

A method is provided for replacing R-407A, R-407C, or R-407F in refrigeration, air conditioning or heat pump systems comprising replacing said R-407A, R-407C, or R-407F with a composition comprising HFC-32, HFC-125, HFO-1234yf, HFC-134a, and $CO_2$ to said refrigeration, air conditioning or heat pump system in place of R-407A, R-407C, or R-407F.

A method is provided for replacing R-404A or R-507 in refrigeration, air conditioning or heat pump systems comprising replacing said R-404A or R-507 with a composition comprising HFC-32, HFC-125, HFO-1234yf, HFC-134a, and $CO_2$ to said refrigeration, air conditioning or heat pump system in place of R-404A or R-507.

Often replacement refrigerants are most useful if capable of being used in the original refrigeration equipment designed for a different refrigerant. Additionally, the compositions as disclosed herein may be useful as replacements for R-410A in equipment designed for R-410A with minimal to no system modifications. Further, the compositions may be useful for replacing R-410A in equipment specifically modified for or produced entirely for these new compositions comprising HFC-32, HFC-125, HFO-1234yf, HFC-134a, and $CO_2$.

Further, the compositions as disclosed herein may be useful as replacements for R-22 in equipment designed for R-22 with minimal to no system modifications. Further, the compositions may be useful for replacing R-22 in equipment specifically modified for or produced entirely for these new compositions comprising HFC-32, HFC-125, HFO-1234yf, HFC-134a, and $CO_2$.

Further, the compositions as disclosed herein may be useful as replacements for R-407A in equipment designed for R-407A with minimal to no system modifications. Further, the compositions may be useful for replacing R-407A in equipment specifically modified for or produced entirely for these new compositions comprising HFC-32, HFC-125, HFO-1234yf, HFC-134a, and $CO_2$.

Further, the compositions as disclosed herein may be useful as replacements for R-407C in equipment designed for R-407C with minimal to no system modifications. Further, the compositions may be useful for replacing R-407C in equipment specifically modified for or produced entirely for these new compositions comprising HFC-32, HFC-125, HFO-1234yf, HFC-134a, and $CO_2$.

Further, the compositions as disclosed herein may be useful as replacements for R-407F in equipment designed for R-407F with minimal to no system modifications. Further, the compositions may be useful for replacing R-407F in equipment specifically modified for or produced entirely for these new compositions comprising HFC-32, HFC-125, HFO-1234yf, HFC-134a, and $CO_2$.

Further, the compositions as disclosed herein may be useful as replacements for R-404A in equipment designed for R-404A with minimal to no system modifications. Further, the compositions may be useful for replacing R-404A in equipment specifically modified for or produced entirely for these new compositions comprising HFC-32, HFC-125, HFO-1234yf, HFC-134a, and $CO_2$.

In many applications, some embodiments of the disclosed compositions are useful as refrigerants and provide at least comparable cooling performance (meaning cooling capacity) as the refrigerant for which a replacement is being sought.

In one embodiment is provided a method for replacing R-22 or R-410A comprising charging a refrigeration, air conditioning or heat pump system with a composition comprising HFC-32, HFC-125, HFO-1234yf, HFC-134a, and $CO_2$ as replacement for said R-22 or R-410A.

In one embodiment is provided a method for replacing R-407A, R-407C or R-407F comprising charging a refrigeration, air conditioning or heat pump system with a composition comprising HFC-32, HFC-125, HFO-1234yf, HFC-134a, and $CO_2$ as replacement for said R-407A, R-407C or R-407F.

In one embodiment is provided a method for replacing R-404A, or R-507 comprising charging a refrigeration, air conditioning or heat pump system with a composition comprising HFC-32, HFC-125, HFO-1234yf, HFC-134a, and $CO_2$ as replacement for said R-404A, or R-507.

In one embodiment of the method, the refrigeration capacity produced by the refrigerant composition comprising HFC-32, HFC-125, HFO-1234yf, HFC-134a, and $CO_2$ is within about ±15% of that produced by R-22 under the same operating conditions. In another embodiment of the method, the refrigeration capacity produced by the refrigerant composition comprising HFC-32, HFC-125, HFO-1234yf, HFC-134a, and $CO_2$ is within about ±10% of that produced by R-22 under the same operating conditions.

In another embodiment of the method, the refrigeration capacity produced by the refrigerant composition comprising HFC-32, HFC-125, HFO-1234yf, HFC-134a, and $CO_2$ is within about ±15% of that produced by R-410A under the same operating conditions. In another embodiment of the method, the refrigeration capacity produced by the refrigerant composition comprising HFC-32, HFC-125, HFO-1234yf, HFC-134a, and $CO_2$ is within about ±10% of that produced by R-410A under the same operating conditions.

Additionally, disclosed herein is an air conditioning or heat pump system containing a composition comprising HFC-32, HFC-125, HFO-1234yf, HFC-134a, and $CO_2$. In another embodiment, the air conditioning or heat pump system comprises an evaporator, compressor, condenser and an expansion device.

In another embodiment is a refrigeration system containing a composition comprising HFC-32, HFC-125, HFO-1234yf, HFC-134a, and $CO_2$. In another embodiment, the refrigeration system comprises an evaporator, compressor, condenser and an expansion device.

It has been found that the compositions of the present invention will have some temperature glide in the heat exchangers. Thus, the systems will operate more efficiently if the heat exchangers are operated in counter-current mode or cross-current mode with counter-current tendency. Counter-current tendency means that the closer the heat exchanger can get to counter-current mode the more efficient the heat transfer. Thus, air conditioning heat exchangers, in particular evaporators, are designed to provide some aspect of counter-current tendency. Therefore, provided herein is an air conditioning or heat pump system wherein said system includes one or more heat exchangers (either evaporators, condensers or both) that operate in counter-current mode or cross-current mode with counter-current tendency.

In another embodiment, provided herein is a refrigeration system wherein said system includes one or more heat exchangers (either evaporators, condensers or both) that operate in counter-current mode or cross-current mode with counter-current tendency.

In one embodiment, the refrigeration, air conditioning or heat pump system is a stationary refrigeration, air conditioning or heat pump system. In another embodiment the refrigeration, air conditioning or heat pump system is a mobile refrigeration, air conditioning or heat pump system.

Additionally, in some embodiments, the disclosed compositions may function as primary refrigerants in secondary loop systems that provide cooling to remote locations by use of a secondary heat transfer fluid, which may comprise water, an aqueous salt solution (e.g., calcium chloride), a glycol, carbon dioxide, or a fluorinated hydrocarbon fluid. In this case the secondary heat transfer fluid is the body to be cooled as it is adjacent to the evaporator and is cooled before moving to a second remote body to be cooled.

Examples of air conditioning or heat pump systems include but are not limited to air conditioners, residential heat pumps, chillers, including flooded evaporator chillers and direct expansion chillers, mobile air conditioning units, dehumidifiers, and combinations thereof.

As used herein, mobile refrigeration, air conditioning or heat pump systems refers to any refrigeration, air conditioner or heat pump apparatus incorporated into a transportation unit for the road, rail, sea or air. Mobile air conditioning or heat pumps systems may be used in automobiles, trucks, railcars or other transportation systems. Mobile refrigeration may include transport refrigeration in trucks, airplanes, or rail cars. In addition, apparatus which are meant to provide refrigeration for a system independent of any moving carrier, known as "intermodal" systems, are including in the present inventions. Such intermodal systems include "containers" (combined sea/land transport) as well as "swap bodies" (combined road and rail transport).

As used herein, stationary air conditioning or heat pump systems are systems that are fixed in place during operation. A stationary air conditioning or heat pump system may be associated within or attached to buildings of any variety. These stationary applications may be stationary air conditioning and heat pumps, including but not limited to chillers, heat pumps, including residential and high temperature heat pumps, residential, commercial or industrial air conditioning systems, and including window, ductless, ducted, packaged terminal, and those exterior but connected to the building such as rooftop systems.

Examples of refrigeration systems the disclosed compositions may be useful in are equipment including commercial, industrial or residential refrigerators and freezers, ice machines, self-contained coolers and freezers, flooded evaporator chillers, direct expansion chillers, walk-in and reach-in coolers and freezers, and combination systems. In some embodiments, the disclosed compositions may be used in supermarket refrigeration systems. Additionally, stationary applications may utilize a secondary loop system that uses a primary refrigerant to produce cooling in one location that is transferred to a remote location via a secondary heat transfer fluid.

EXAMPLES

The concepts disclosed herein will be further described in the following examples, which do not limit the scope of the invention described in the claims.

Example 1

Cooling Performance

Cooling performance at typical conditions for air conditioning and heat pump apparatus for compositions of the present invention is determined and displayed in Table 1 as compared to R-22. The GWP values are from the Intergovernmental Panel on Climate Change (IPCC) Fourth Assessment Report, Working Group I, 2007. Evaporator glide (Evap Glide), volumetric capacity (Vol Cap), and Compressor discharge temperatures (Compr Disch Temp) are calculated from physical property measurements for the compositions of the present invention at the following specific conditions:

| | |
|---|---|
| Evaporator temperature | 50° F. (10° C.) |
| Condenser temperature | 115° F. (46.1° C.) |
| Subcool liquid temperature | 100° F. (37.8° C.) |
| Suction temperature | 70° F. (21.1° C.) |
| Compressor efficiency | 70% |

TABLE 1

| Composition (wt %) | GWP (AR4) | Evap Glide (° F.) | Vol Cap, kJ/m³ (Btu/ft³) | Rel Cap to R-22 (%) | Compr Disch Temp (° F.) |
|---|---|---|---|---|---|
| R-22 (100) | 1810 | 0 | 117.99 | 100 | 184.3 |
| R32/R125/R1234yf/ R134a/CO₂ (wt %) | | | | | |
| 10.8/12.7/45.1/29.4/2.0 | 941 | 5.4 (9.8) | 3930 (105.55) | 90 | 70.4 (158.7) |
| 13.7/13.7/36.3/34.3/2.0 | 1065 | 5.7 (10.3) | 4124 (110.77) | 94 | 72.0 (161.6) |
| 10.6/12.5/44.2/28.8/4.0 | 922 | 7.1 (12.7) | 4159 (111.69) | 95 | 72.0 (161.7) |
| 13.4/13.4/35.5/33.6/4.0 | 1043 | 7.3 (13.1) | 4353 (116.92) | 99 | 73.6 (164.4) |
| 10.3/12.2/43.2/28.2/6.0 | 903 | 8.5 (15.4) | 4389 (117.87) | 100 | 73.6 (164.4) |
| 13.3/13.3/35.2/33.3/5.0 | 1032 | 8.0 (14.4) | 4468 (120) | 102 | 74.3 (165.8) |
| 19.6/19.6/30.4/28.4/2.0 | 1226 | 5.8 (10.5) | 4540 (121.94) | 103 | 73.9 (165) |
| 20/20/30/28/2.0 | 1237 | 5.8 (10.5) | 4569 (122.7) | 104 | 74.0 (165.2) |

TABLE 1-continued

| Composition (wt %) | GWP (AR4) | Evap Glide (° F.) | Vol Cap, kJ/m³ (Btu/ft³) | Rel Cap to R-22 (%) | Compr Disch Temp (° F.) |
|---|---|---|---|---|---|
| 13.2/13.2/34.8/32.9/6.0 | 1021 | 8.7 (15.6) | 4583 (123.09) | 104 | 75.0 (167.1) |
| 10.1/12.0/42.3/27.6/8.0 | 883 | 9.9 (17.9) | 4620 (124.09) | 105 | 75.0 (167) |
| 20/20/29.5/27.6/3.0 | 1230 | 6.5 (11.7) | 4696 (126.11) | 107 | 74.7 (166.5) |
| 22/22/27.9/26.1/2.0 | 1293 | 5.7 (10.3) | 4710 (126.49) | 107 | 74.6 (166.3) |
| 19.2/19.2/29.8/27.8/4.0 | 1201 | 7.2 (12.9) | 4766 (127.99) | 109 | 75.2 (167.4) |
| 12.9/12.9/34/32.2/8.0 | 1000 | 10.0 (18) | 4814 (129.3) | 110 | 76.4 (169.5) |
| 20/20/28.9/27.1/4.0 | 1223 | 7.1 (12.8) | 4823 (129.53) | 110 | 75.4 (167.8) |
| 22/22/27.4/25.6/3.0 | 1286 | 6.3 (11.4) | 4837 (129.92) | 110 | 75.3 (167.6) |
| 24/24/25.8/24.2/2.0 | 1349 | 5.5 (10) | 4850 (130.26) | 110 | 75.2 (167.4) |
| 9.9/11.7/41.4/27/10 | 864 | 11.2 (20.2) | 4854 (130.35) | 111 | 76.4 (169.5) |
| 20/20/28.4/26.6/5.0 | 1216 | 7.7 (13.9) | 4950 (132.95) | 113 | 76.1 (169) |
| 22/22/26.9/25.1/4.0 | 1279 | 6.9 (12.5) | 4965 (133.36) | 113 | 76.0 (168.8) |
| 24/24/25.3/23.7/3.0 | 1342 | 6.1 (11) | 4979 (133.71) | 113 | 75.9 (168.6) |
| 26/26/23.8/22.2/2.0 | 1404 | 5.3 (9.6) | 4990 (134.02) | 114 | 75.8 (168.5) |
| 18.8/18.8/29.1/27.3/6.0 | 1176 | 8.4 (15.1) | 4992 (134.06) | 114 | 76.5 (169.7) |
| 7.0/6.0/46/34/7.0 | 745 | 9.1 (16.4) | 4261 (114.4) | 97 | 73.7 (165.7) |

All the compositions of the present invention provided in Table 1 provide volumetric capacity within ±15% of that for R-22, while maintaining reasonable glide in the evaporator and having reduced compressor discharge temperatures as compared to R-22. Many of the compositions of Table 1 provide volumetric capacity within ±10% of that for R-22.

Example 2

Cooling Performance

Cooling performance at typical conditions for air conditioning and heat pump apparatus for compositions of the present invention is determined and displayed in Table 2 as compared to R-410A. The GWP values are from the Intergovernmental Panel on Climate Change (IPCC) Fourth Assessment Report, Working Group I, 2007. Evaporator glide (Evap Glide), volumetric capacity (Vol Cap), and Compressor discharge temperatures (Compr Disch Temp) are calculated from physical property measurements for the compositions of the present invention at the following specific conditions:

| | |
|---|---|
| Evaporator temperature | 50° F. (10° C.) |
| Condenser temperature | 115° F. (46.1° C.) |
| Subcool liquid temperature | 100° F. (37.8° C.) |
| Suction temperature | 70° F. (21.1° C.) |
| Compressor efficiency | 70% |

TABLE 2

| Composition (wt %) | GWP (AR4) | Evap Glide, ° C. (° F.) | Vol Cap, kJ/m³ (Btu/ft³) | Rel Cap to R-410A (%) | Compr Disch Temp, ° C. (° F.) |
|---|---|---|---|---|---|
| R-410A (100) | 2088 | 0 | 6284 (168.76) | 100 | 81.5 (178.7) |
| R32/R125/R1234yf/R134a/CO₂, wt % | | | | | |
| 32/32/17.6/16.4/2.0 | 1572 | 4.4 (8.0) | 5405 (145.15) | 86 | 77.6 (171.6) |
| 34/34/15.5/14.5/2.0 | 1627 | 4.1 (7.3) | 5541 (148.80) | 88 | 78.2 (172.7) |
| 36/36/13.4/12.6/2.0 | 1683 | 3.7 (6.7) | 5675 (152.41) | 90 | 78.7 (173.7) |
| 38/38/11.4/10.6/2.0 | 1739 | 3.3 (5.9) | 5808 (155.97) | 92 | 79.3 (174.7) |
| 40/40/09.3/08.7/2.0 | 1795 | 2.9 (5.2) | 5938 (159.48) | 95 | 79.8 (175.7) |
| 30/30/19.1/17.9/3.0 | 1509 | 5.3 (9.5) | 5398 (144.98) | 86 | 77.6 (171.7) |
| 32/32/17.1/16.0/3.0 | 1565 | 4.9 (8.8) | 5536 (148.69) | 88 | 78.2 (172.7) |
| 34/34/15.0/14.0/3.0 | 1621 | 4.5 (8.2) | 5672 (152.35) | 90 | 78.7 (173.7) |
| 36/36/12.9/12.1/3.0 | 1676 | 4.1 (7.4) | 5808 (155.98) | 92 | 79.3 (174.7) |
| 38/38/10.9/10.2/3.0 | 1732 | 3.7 (6.7) | 5941 (159.56) | 95 | 79.8 (175.7) |
| 40/40/8.8/8.2/3.0 | 1788 | 3.3 (5.9) | 6072 (163.07) | 97 | 80.3 (176.6) |
| 28/28/20.7/19.3/4.0 | 1446 | 6.1 (11.0) | 5390 (144.76) | 86 | 77.7 (171.8) |
| 30/30/18.6/17.4/4.0 | 1502 | 5.8 (10.4) | 5530 (148.51) | 88 | 78.2 (172.8) |
| 32/32/16.5/15.5/4.0 | 1558 | 5.4 (9.7) | 5668 (152.23) | 90 | 78.8 (173.8) |
| 34/34/14.5/13.5/4.0 | 1614 | 5.0 (8.9) | 5805 (155.91) | 92 | 79.3 (174.7) |
| 36/36/12.4/11.6/4.0 | 1669 | 4.5 (8.1) | 5941 (159.55) | 95 | 79.8 (175.7) |
| 38/38/10.3/9.7/4.0 | 1725 | 4.1 (7.3) | 6074 (163.13) | 97 | 80.4 (176.6) |
| 26/26/22.2/20.8/5.0 | 1384 | 6.9 (12.5) | 5379 (144.47) | 86 | 77.8 (172.0) |
| 28/28/20.2/18.9/05 | 1439 | 6.6 (11.8) | 5521 (148.27) | 88 | 78.3 (172.9) |
| 30/30/18.1/16.9/5.0 | 1495 | 6.2 (11.2) | 5661 (152.04) | 90 | 78.8 (173.9) |
| 32/32/16.0/15.0/5.0 | 1551 | 5.8 (10.4) | 5800 (155.77) | 92 | 79.3 (174.8) |
| 34/34/14.0/13.1/5.0 | 1607 | 5.4 (9.6) | 5938 (159.47) | 94 | 79.9 (175.7) |
| 36/36/11.9/11.1/5.0 | 1662 | 4.9 (8.8) | 6074 (163.12) | 97 | 80.4 (176.7) |
| 38/38/9.8/9.2/05.0 | 1718 | 4.4 (8.0) | 6207 (166.71) | 99 | 80.9 (177.6) |
| 24/24/23.8/22.2/6.0 | 1321 | 7.7 (13.9) | 5366 (144.12) | 85 | 77.8 (172.1) |
| 26/26/21.7/20.3/6.0 | 1377 | 7.4 (13.3) | 5509 (147.96) | 88 | 78.4 (173.1) |
| 28/28/19.6/18.4/6.0 | 1432 | 7.0 (12.7) | 5651 (151.78) | 90 | 78.9 (174.0) |
| 30/30/17.6/16.4/6.0 | 1488 | 6.6 (11.9) | 5792 (155.57) | 92 | 79.4 (174.9) |
| 32/32/15.5/14.5/6.0 | 1544 | 6.2 (11.1) | 5932 (159.32) | 94 | 79.9 (175.8) |
| 34/34/13.4/12.6/6.0 | 1600 | 5.7 (10.3) | 6070 (163.03) | 97 | 80.4 (176.7) |
| 36/36/11.4/10.6/6.0 | 1656 | 5.3 (9.5) | 6206 (166.69) | 99 | 80.9 (177.6) |
| 38/38/9.3/8.7/6.0 | 1711 | 4.8 (8.6) | 6341 (170.29) | 101 | 81.4 (178.5) |
| 22/22/24.8/23.2/8.0 | 1251 | 9.0 (16.3) | 5481 (147.20) | 87 | 78.6 (173.4) |
| 24/24/22.7/21.3/8.0 | 1307 | 8.7 (15.6) | 5626 (151.10) | 90 | 79.0 (174.3) |
| 26/26/20.7/19.3/8.0 | 1363 | 8.3 (14.9) | 5770 (154.97) | 92 | 79.5 (175.1) |

TABLE 2-continued

| Composition (wt %) | GWP (AR4) | Evap Glide, °C. (°F.) | Vol Cap, kJ/m³ (Btu/ft³) | Rel Cap to R-410A (%) | Compr Disch Temp, °C. (°F.) |
|---|---|---|---|---|---|
| 28/28/18.6/17.4/8.0 | 1419 | 7.8 (14.1) | 5914 (158.82) | 94 | 80.0 (176.0) |
| 30/30/16.5/15.5/8.0 | 1474 | 7.4 (13.3) | 6056 (162.64) | 96 | 80.5 (176.9) |
| 32/32/14.5/13.5/8.0 | 1530 | 6.9 (12.4) | 6196 (166.42) | 99 | 81.0 (177.7) |
| 34/34/12.4/11.6/8.0 | 1586 | 6.4 (11.5) | 6335 (170.15) | 101 | 81.4 (178.6) |
| 36/36/10.3/9.7/8.0 | 1642 | 5.9 (10.6) | 6472 (173.82) | 103 | 81.9 (179.4) |
| 38/38/8.3/7.7/8.0 | 1697 | 5.4 (9.6) | 6606 (177.42) | 105 | 82.4 (180.3) |
| 18/18/27.9/26.1/10 | 1126 | 10.6 (19.1) | 5445 (146.25) | 87 | 78.8 (173.9) |
| 20/20/25.8/24.2/10 | 1182 | 10.3 (18.5) | 5593 (150.21) | 89 | 79.3 (174.7) |
| 22/22/23.8/22.2/10 | 1237 | 9.9 (17.8) | 5740 (154.16) | 91 | 79.7 (175.5) |
| 24/24/21.7/20.3/10 | 1293 | 9.5 (17.1) | 5886 (158.09) | 94 | 80.2 (176.3) |
| 26/26/19.6/18.4/10 | 1349 | 9.0 (16.3) | 6032 (162.00) | 96 | 80.6 (177.1) |
| 28/28/17.6/16.4/10 | 1405 | 8.6 (15.4) | 6176 (165.87) | 98 | 81.1 (177.9) |
| 30/30/15.5/14.5/10 | 1461 | 8.1 (14.5) | 6319 (169.71) | 101 | 81.5 (178.7) |
| 32/32/13.4/12.6/10 | 1516 | 7.5 (13.5) | 6460 (173.51) | 103 | 82.0 (179.6) |
| 34/34/11.4/10.6/10 | 1572 | 7.0 (12.6) | 6600 (177.25) | 105 | 82.4 (180.4) |
| 36/36/9.3/8.7/10 | 1628 | 6.4 (11.5) | 6737 (180.93) | 107 | 82.9 (181.2) |
| 38/38/7.2/6.8/10 | 1684 | 5.9 (10.5) | 6871 (184.53) | 109 | 83.3 (182.0) |
| 17.6/17.6/27.3/25.5/12 | 1101 | 11.6 (20.9) | 5673 (152.36) | 90 | 79.9 (175.7) |
| 9.5/9.5/39.6/25.8/14 | 826 | 13.8 (24.8) | 5424 (145.67) | 86 | 78.5 (173.3) |
| 17.2/17.2/26.7/24.9/14 | 1076 | 12.5 (22.5) | 5901 (158.48) | 94 | 80.8 (177.5) |
| 9.2/9.2/38.6/25.2/16 | 807 | 14.9 (26.9) | 5716 (153.51) | 91 | 79.4 (175.0) |
| 16.8/16.8/26.0/24.4/16 | 1051 | 13.3 (23.9) | 6129 (164.60) | 98 | 81.8 (179.2) |
| 9.0/10.7/37.7/24.6/18 | 787 | 16.0 (28.7) | 6003 (161.23) | 96 | 80.3 (176.5) |
| 16.4/16.4/25.4/23.8/18 | 1026 | 14.0 (25.3) | 6372 (171.12) | 101 | 82.6 (180.7) |
| 8.8/10.4/36.8/24.0/20 | 768 | 16.9 (30.4) | 6286 (168.81) | 100 | 81.1 (178.0) |
| 16/16/24.8/23.2/20 | 1001 | 14.8 (26.6) | 6625 (177.94) | 105 | 83.4 (182.1) |
| 11/8.0/36/27/18 | 742 | 15.7 (28.3) | 6083 (163.3) | 97 | 81.0 (177.8) |

All the compositions of the present invention provided in Table 2 provide volumetric capacity within ±15% of that for R-410A, while maintaining reasonable glide in the evaporator and having reduced compressor discharge temperatures as compared to R-410A. Many of the compositions of Table 1 provide volumetric capacity within ±10% of that for R-410A.

Example 3

Flammability

The following compositions are tested under the conditions of ASTM E-681-09 with an electronic ignition source. Such tests of flammability are conducted on compositions of the present disclosure at 101 kPa (14.7 psia), and 50 percent relative humidity at 23° C. Tests are conducted at 60° C. at various concentrations in air. If compositions are non-flammable at 60° C., they are determined to be non-flammable by ASHRAE definition. Results are shown in Tables 3 and 4.

TABLE 3

| Composition (wt %) R32/R125/R1234yf/ R134a/CO2 | Flammability at 60° C. |
|---|---|
| 10.8/12.7/45.1/29.4/2.0 | non-flammable |
| 13.7/13.7/36.3/34.3/2.0 | non-flammable |
| 10.6/12.5/44.2/28.8/4.0 | non-flammable |
| 13.4/13.4/35.5/33.6/4.0 | non-flammable |
| 10.3/12.2/43.2/28.2/6.0 | non-flammable |
| 13.3/13.3/35.2/33.3/5.0 | non-flammable |
| 19.6/19.6/30.4/28.4/2.0 | non-flammable |
| 20/20/30/28/2.0 | non-flammable |
| 13.2/13.2/34.8/32.9/6.0 | non-flammable |
| 10.1/12.0/42.3/27.6/8.0 | non-flammable |
| 20/20/29.5/27.6/3.0 | non-flammable |
| 22/22/27.9/26.1/2.0 | non-flammable |
| 19.2/19.2/29.8/27.8/4.0 | non-flammable |
| 12.9/12.9/34/32.2/8.0 | non-flammable |
| 20/20/28.9/27.1/4.0 | non-flammable |
| 22/22/27.4/25.6/3.0 | non-flammable |
| 24/24/25.8/24.2/2.0 | non-flammable |
| 9.9/11.7/41.4/27/10 | non-flammable |
| 20/20/28.4/26.6/5.0 | non-flammable |
| 22/22/26.9/25.1/4.0 | non-flammable |
| 24/24/25.3/23.7/3.0 | non-flammable |
| 26/26/23.8/22.2/2.0 | non-flammable |
| 18.8/18.8/29.127.3/6.0 | non-flammable |
| 32/32/17.6/16.4/2.0 | non-flammable |
| 34/34/15.5/14.5/2.0 | non-flammable |
| 36/36/13.4/12.6/2.0 | non-flammable |
| 38/38/11.4/10.6/2.0 | non-flammable |
| 40/40/09.3/08.7/2.0 | non-flammable |
| 30/30/19.1/17.9/3.0 | non-flammable |
| 32/32/17.1/16.0/3.0 | non-flammable |
| 34/34/15.0/14.0/3.0 | non-flammable |
| 36/36/12.9/12.1/3.0 | non-flammable |
| 38/38/10.9/10.2/3.0 | non-flammable |
| 40/40/8.8/8.2/3.0 | non-flammable |
| 28/28/20.7/19.3/4.0 | non-flammable |
| 30/30/18.6/17.4/4.0 | non-flammable |
| 32/32/16.5/15.5/4.0 | non-flammable |
| 34/34/14.5/13.5/4.0 | non-flammable |
| 36/36/12.4/11.6/4.0 | non-flammable |
| 38/38/10.3/9.7/4.0 | non-flammable |
| 26/26/22.2/20.8/5.0 | non-flammable |
| 28/28/20.2/18.9/05 | non-flammable |
| 30/30/18.1/16.9/5.0 | non-flammable |
| 32/32/16.0/15.0/5.0 | non-flammable |
| 34/34/14.0/13.1/5.0 | non-flammable |
| 36/36/11.9/11.1/5.0 | non-flammable |
| 38/38/9.8/9.2/05.0 | non-flammable |
| 24/24/23.8/22.2/6.0 | non-flammable |
| 26/26/21.7/20.3/6.0 | non-flammable |
| 28/28/19.6/18.4/6.0 | non-flammable |
| 30/30/17.6/16.4/6.0 | non-flammable |
| 32/32/15.5/14.5/6.0 | non-flammable |
| 34/34/13.4/12.6/6.0 | non-flammable |
| 36/36/11.4/10.6/6.0 | non-flammable |
| 38/38/9.3/8.7/6.0 | non-flammable |
| 22/22/24.8/23.2/8.0 | non-flammable |
| 24/24/22.7/21.3/8.0 | non-flammable |
| 26/26/20.7/19.3/8.0 | non-flammable |
| 28/28/18.6/17.4/8.0 | non-flammable |
| 30/30/16.5/15.5/8.0 | non-flammable |
| 32/32/14.5/13.5/8.0 | non-flammable |
| 34/34/12.4/11.6/8.0 | non-flammable |
| 36/36/10.3/9.7/8.0 | non-flammable |
| 38/38/8.3/7.7/8.0 | non-flammable |
| 18/18/27.9/26.1/10 | non-flammable |
| 20/20/25.8/24.2/10 | non-flammable |
| 22/22/23.8/22.2/10 | non-flammable |
| 24/24/21.7/20.3/10 | non-flammable |
| 26/26/19.6/18.4/10 | non-flammable |
| 28/28/17.6/16.4/10 | non-flammable |
| 30/30/15.5/14.5/10 | non-flammable |

TABLE 3-continued

| Composition (wt %) R32/R125/R1234yf/ R134a/CO2 | Flammability at 60° C. |
|---|---|
| 32/32/13.4/12.6/10 | non-flammable |
| 34/34/11.4/10.6/10 | non-flammable |
| 36/36/9.3/8.7/10 | non-flammable |
| 38/38/7.2/6.8/10 | non-flammable |
| 17.6/17.6/27.3/25.5/12 | non-flammable |
| 9.5/9.5/39.6/25.8/14 | non-flammable |
| 17.2/17.2/26.7/24.9/14 | non-flammable |
| 9.2/9.2/38.6/25.2/16 | non-flammable |
| 16.8/16.8/26.0/24.4/16 | non-flammable |
| 9.0/10.7/37.7/24.6/18 | non-flammable |
| 16.4/16.4/25.4/23.8/18 | non-flammable |
| 8.8/10.4/36.8/24.0/20 | non-flammable |
| 16/16/24.8/23.2/20 | non-flammable |
| 32/32/17.6/16.4/2.0 | non-flammable |
| 34/34/15.5/14.5/2.0 | non-flammable |
| 36/36/13.4/12.6/2.0 | non-flammable |
| 38/38/11.4/10.6/2.0 | non-flammable |
| 40/40/09.3/08.7/2.0 | non-flammable |
| 30/30/19.1/17.9/3.0 | non-flammable |
| 32/32/17.1/16.0/3.0 | non-flammable |
| 34/34/15.0/14.0/3.0 | non-flammable |
| 36/36/12.9/12.1/3.0 | non-flammable |
| 38/38/10.9/10.2/3.0 | non-flammable |
| 40/40/8.8/8.2/3.0 | non-flammable |
| 28/28/20.7/19.3/4.0 | non-flammable |
| 30/30/18.6/17.4/4.0 | non-flammable |
| 32/32/16.5/15.5/4.0 | non-flammable |
| 34/34/14.5/13.5/4.0 | non-flammable |
| 36/36/12.4/11.6/4.0 | non-flammable |
| 38/38/10.3/9.7/4.0 | non-flammable |
| 26/26/22.2/20.8/5.0 | non-flammable |
| 28/28/20.2/18.9/05 | non-flammable |
| 30/30/18.1/16.9/5.0 | non-flammable |
| 32/32/16.0/15.0/5.0 | non-flammable |
| 34/34/14.0/13.1/5.0 | non-flammable |
| 36/36/11.9/11.1/5.0 | non-flammable |
| 38/38/9.8/9.2/05.0 | non-flammable |
| 24/24/23.8/22.2/6.0 | non-flammable |
| 26/26/21.7/20.3/6.0 | non-flammable |
| 28/28/19.6/18.4/6.0 | non-flammable |
| 30/30/17.6/16.4/6.0 | non-flammable |
| 32/32/15.5/14.5/6.0 | non-flammable |
| 34/34/13.4/12.6/6.0 | non-flammable |
| 36/36/11.4/10.6/6.0 | non-flammable |
| 38/38/9.3/8.7/6.0 | non-flammable |
| 22/22/24.8/23.2/8.0 | non-flammable |
| 24/24/22.7/21.3/8.0 | non-flammable |
| 26/26/20.7/19.3/8.0 | non-flammable |
| 28/28/18.6/17.4/8.0 | non-flammable |
| 30/30/16.5/15.5/8.0 | non-flammable |
| 32/32/14.5/13.5/8.0 | non-flammable |
| 34/34/12.4/11.6/8.0 | non-flammable |
| 36/36/10.3/9.7/8.0 | non-flammable |
| 38/38/8.3/7.7/8.0 | non-flammable |
| 18/18/27.9/26.1/10 | non-flammable |
| 20/20/25.8/24.2/10 | non-flammable |
| 22/22/23.8/22.2/10 | non-flammable |
| 24/24/21.7/20.3/10 | non-flammable |
| 26/26/19.6/18.4/10 | non-flammable |
| 28/28/17.6/16.4/10 | non-flammable |
| 30/30/15.5/14.5/10 | non-flammable |
| 32/32/13.4/12.6/10 | non-flammable |
| 34/34/11.4/10.6/10 | non-flammable |
| 36/36/9.3/8.7/10 | non-flammable |
| 38/38/7.2/6.8/10 | non-flammable |
| 17.6/17.6/27.3/25.5/12 | non-flammable |
| 9.5/9.5/39.6/25.8/14 | non-flammable |
| 17.2/17.2/26.7/24.9/14 | non-flammable |
| 9.2/9.2/38.6/25.2/16 | non-flammable |
| 16.8/16.8/26.0/24.4/16 | non-flammable |
| 9.0/10.7/37.7/24.6/18 | non-flammable |
| 16.4/16.4/25.4/23.8/18 | non-flammable |
| 8.8/10.4/36.8/24.0/20 | non-flammable |
| 16/16/24.8/23.2/20 | non-flammable |

Results show compositions of the present invention are nonflammable.

Example 4

Cooling Performance

Cooling performance at typical conditions for air conditioning and heat pump apparatus for compositions of the present invention is determined and displayed in Table 4 as compared to R-407A, R407C and R407F. The GWP values are from the Intergovernmental Panel on Climate Change (IPCC) Fourth Assessment Report, Working Group I, 2007. Evaporator glide (Evap Glide), volumetric capacity (Vol Cap), and Compressor discharge temperatures (Compr Disch Temp) are calculated from physical property measurements for the compositions of the present invention at the following specific conditions:

| Evaporator temperature | 50° F. (10° C.) |
|---|---|
| Condenser temperature | 115° F. (46.1° C.) |
| Subcool liquid temperature | 100° F. (37.8° C.) |
| Suction temperature | 70° F. (21.1° C.) |
| Compressor efficiency | 70% |

TABLE 4

| Composition (wt %) | GWP (AR4) | Evap Glide, ° C. (° F.) | Vol Cap, kJ/m$^3$ (Btu/ft$^3$) | Rel Cap to R-22 | Compr Disch Temp, ° C. (° F.) |
|---|---|---|---|---|---|
| R-407A | 2107 | 4.2 | 4606 | 105 | 74.2 |
| R-4070 | 1774 | 4.7 | 4450 | 101 | 76.1 |
| R-407F | 1825 | 4.4 | 4883 | 111 | 77.9 |
| R32/R125/R1234yf/ R134a/CO2 (wt %) | | | | | |
| 10.8/12.7/45.1/29.4/2.0 | 941 | 5.4 (9.8) | 3930 (105.55) | 90 | 70.4 (158.7) |
| 13.7/13.7/36.3/34.3/2.0 | 1065 | 5.7 (10.3) | 4124 (110.77) | 94 | 72.0 (161.6) |
| 10.6/12.5/44.2/28.8/4.0 | 922 | 7.1 (12.7) | 4159 (111.69) | 95 | 72.0 (161.7) |
| 13.4/13.4/35.5/33.6/4.0 | 1043 | 7.3 (13.1) | 4353 (116.92) | 99 | 73.6 (164.4) |
| 10.3/12.2/43.2/28.2/6.0 | 903 | 8.5 (15.4) | 4389 (117.87) | 100 | 73.6 (164.4) |
| 13.3/13.3/35.2/33.3/5.0 | 1032 | 8.0 (14.4) | 4468 (120) | 102 | 74.3 (165.8) |
| 19.6/19.6/30.4/28.4/2.0 | 1226 | 5.8 (10.5) | 4540 (121.94) | 103 | 73.9 (165) |
| 20/20/30/28/2.0 | 1237 | 5.8 (10.5) | 4569 (122.7) | 104 | 74.0 (165.2) |
| 13.2/13.2/34.8/32.9/6.0 | 1021 | 8.7 (15.6) | 4583 (123.09) | 104 | 75.0 (167.1) |
| 10.1/12.0/42.3/27.6/8.0 | 883 | 9.9 (17.9) | 4620 (124.09) | 105 | 75.0 (167) |
| 20/20/29.5/27.6/3.0 | 1230 | 6.5 (11.7) | 4696 (126.11) | 107 | 74.7 (166.5) |
| 22/22/27.9/26.1/2.0 | 1293 | 5.7 (10.3) | 4710 (126.49) | 107 | 74.6 (166.3) |
| 19.2/19.2/29.8/27.8/4.0 | 1201 | 7.2 (12.9) | 4766 (127.99) | 109 | 75.2 (167.4) |
| 12.9/12.9/34/32.2/8.0 | 1000 | 10.0 (18) | 4814 (129.3) | 110 | 76.4 (169.5) |
| 20/20/28.9/27.1/4.0 | 1223 | 7.1 (12.8) | 4823 (129.53) | 110 | 75.4 (167.8) |
| 22/22/27.4/25.6/3.0 | 1286 | 6.3 (11.4) | 4837 (129.92) | 110 | 75.3 (167.6) |
| 24/24/25.8/24.2/2.0 | 1349 | 5.5 (10) | 4850 (130.26) | 110 | 75.2 (167.4) |
| 9.9/11.7/41.4/27/10 | 864 | 11.2 (20.2) | 4854 (130.35) | 111 | 76.4 (169.5) |
| 20/20/28.4/26.6/5.0 | 1216 | 7.7 (13.9) | 4950 (132.95) | 113 | 76.1 (169) |
| 22/22/26.9/25.1/4.0 | 1279 | 6.9 (12.5) | 4965 (133.36) | 113 | 76.0 (168.8) |
| 24/24/25.3/23.7/3.0 | 1342 | 6.1 (11) | 4979 (133.71) | 113 | 75.9 (168.6) |
| 26/26/23.8/22.2/2.0 | 1404 | 5.3 (9.6) | 4990 (134.02) | 114 | 75.8 (168.5) |

TABLE 4-continued

| Composition (wt %) | GWP (AR4) | Evap Glide, °C. (° F.) | Vol Cap, kJ/m³ (Btu/ft³) | Rel Cap to R-22 | Compr Disch Temp, °C. (° F.) |
|---|---|---|---|---|---|
| 18.8/18.8/29.127.3/6.0 | 1176 | 8.4 (15.1) | 4992 (134.06) | 114 | 76.5 (169.7) |

Example 5

Cooling Performance

Cooling performance at typical conditions for air conditioning, medium temperature refrigeration and low temperature refrigeration apparatus for compositions of the present invention is determined and displayed in Tables 5 (air conditioning), 6 (medium temp refrigeration) and 7 (low temp refrigeration), as compared to R-410A. The GWP values are from the Intergovernmental Panel on Climate Change (IPCC) Fourth Assessment Report, Working Group I, 2007. Avg glide (average for evaporator glide and condenser glide), volumetric capacity (Vol Cap), COP (coefficient of performance–measure of energy efficiency), Compressor discharge temperatures (Compr Disch Temp) and relative mass flow rate (relative to R410A) are calculated from physical property measurements for the compositions of the present invention at the following specific conditions:

Air Conditioning:

| Evaporator temperature | 4.4° C. |
|---|---|
| Condenser temperature | 37.78° C. |
| Subcool amount | 5 K |
| Suction temperature | 18° C. |
| Compressor efficiency | 70% |

TABLE 5

| Composition (wt %) | GWP (AR4) | Avg Glide, °C. | Vol Cap, kJ/m³ | Rel Cap to R410A, % | COP | COP Rel to R410A, % | Compr Disch Temp, °C. | Mass Flow Rel to R410A, % |
|---|---|---|---|---|---|---|---|---|
| R-410A (HFC-32/HFC-125, 50/50 wt %) | 2088 | 0.1 | 5810 | 100 | 4.706 | 100 | 78 | 100 |
| 1234yf/32/125/134a/CO₂ (17/29.6/29.9/17.5/6 wt %) | 1497 | 8.4 | 5539 | 95 | 4.707 | 100 | 76 | 99 |
| 1234yf/32/125/134a/CO₂ (14/36/30/14/6 wt %) | 1494 | 7.3 | 5784 | 100 | 4.684 | 99.5 | 78 | 100 |
| Comparative | | | | | | | | |
| 1234yf/CO₂ (85/15 wt %) | 4 | 23.4 | 5057 | 87 | 4.798 | 102 | 69 | 101 |
| 1234yf/CO₂ (80/20 wt %) | 3 | 26.2 | 5847 | 101 | 4.739 | 101 | 72 | 114 |
| 1234yf/CO₂ (75/25 wt %) | 3 | 27.5 | 6579 | 113 | 4.643 | 99 | 74 | 126 |

The compositions of the present invention are excellent matches for R-410A in air conditioning with a close match for volumetric capacity, COP and mass flow rate. The comparative compositions with only 1234yf and CO₂ can only match capacity when about 20 wt % CO₂ is in the composition, which leads to unacceptably high temperature glide and a high mass flow rate as well. Clearly, the compositions of the present invention are better replacements for R-410A.

Medium Temperature Refrigeration:

| Evaporator temperature | −10° C. |
|---|---|
| Condenser temperature | 40° C. |
| Subcool amount | 0 K |
| Suction temperature | 10° C. |
| Compressor efficiency | 70% |

TABLE 6

| Composition (wt %) | GWP (AR4) | Avg Glide, °C. | Vol Cap, kJ/m³ | Rel Cap to R410A, % | COP | COP Rel to R410A, % | Compr Disch Temp, °C. | Mass Flow Rel to R410A, % |
|---|---|---|---|---|---|---|---|---|
| R-410A (HFC-32/HFC-125, 50/50 wt %) | 2088 | 0.1 | 3257 | 100 | 2.589 | 100 | 102 | 100 |

TABLE 6-continued

| Composition (wt %) | GWP (AR4) | Avg Glide, ° C. | Vol Cap, kJ/m³ | Rel Cap to R410A, % | COP | COP Rel to R410A, % | Compr Disch Temp, ° C. | Mass Flow Rel to R410A, % |
|---|---|---|---|---|---|---|---|---|
| 1234yf/32/125/134a/CO₂ (17/29.6/29.9/17.5/6 wt %) | 1497 | 7.5 | 2991 | 92 | 2.569 | 99 | 99 | 95 |
| 1234yf/32/125/134a/CO₂ (14/36/30/14/6 wt %) | 1494 | 6.6 | 3152 | 97 | 2.560 | 99 | 103 | 97 |

For medium temperature refrigeration, the compositions of the present invention again provide a good match for volumetric capacity, COP and mass flow.

Low Temperature Refrigeration:

| | |
|---|---|
| Evaporator temperature | −35° C. |
| Condenser temperature | 40° C. |
| Subcool amount | 0 K |
| Suction temperature | −15° C. |
| Compressor efficiency | 70% |

TABLE 7

| Composition (wt %) | GWP (AR4) | Avg Glide, ° C. | Vol Cap, kJ/m³ | Rel Cap to R410A, % | COP | COP Rel to R410A, % | Compr Disch Temp, ° C. | Mass Flow Rel to R410A, % |
|---|---|---|---|---|---|---|---|---|
| R-410A (HFC-32/HFC-125, 50/50 wt %) | 2088 | 0.1 | 1203 | 100 | 1.386 | 100 | 133 | 100 |
| 1234yf/32/125/134a/CO₂ (17/29.6/29.9/17.5/6 wt %) | 1497 | 8.4 | 1041 | 87 | 1.366 | 99 | 127 | 91 |
| 1234yf/32/125/134a/CO₂ (14/36/30/14/6 wt %) | 1494 | 7.3 | 1115 | 93 | 1.366 | 99 | 132 | 93 |

For low temperature refrigeration, the compositions of the present invention again provide a good match for volumetric capacity, COP and mass flow.

Example 6

Vapor Leak and Flammability

A vapor leak simulation was performed using a composition of the present invention. The composition comprised R-32/125/134a/1234yf/CO₂ at 36/30/14/14/6 wt %. The program NIST Refleak 4.0 was used to simulate a vapor leak using a cylinder initially charged at 90% full by mass at 54.4° C. The cylinder was cooled to −40° C. and a vapor leak conducted with compositions of the liquid and vapor phases recorded. Leak results for the liquid phase composition are in Table 8 below and vapor phase in Table 9.

TABLE 8

| Wt % leaked | Liquid Composition wt % | | | | | |
|---|---|---|---|---|---|---|
| | R-32 | R-125 | R-134a | R-234yf | CO2 | 32 + 1234yf |
| 0 | 35.99 | 30.02 | 14.04 | 14.03 | 5.92 | 50.02 |
| 2 | 35.96 | 30.12 | 14.23 | 14.17 | 5.52 | 50.13 |
| 10 | 35.36 | 30.21 | 15.39 | 14.76 | 4.28 | 50.12 |
| 20 | 34.68 | 30.44 | 16.64 | 15.52 | 2.72 | 50.20 |
| 30 | 33.54 | 30.44 | 18.13 | 16.32 | 1.57 | 49.86 |
| 40 | 31.88 | 30.15 | 19.95 | 17.22 | 0.80 | 49.10 |
| 45 | 30.82 | 29.89 | 21.03 | 17.71 | 0.55 | 48.53 |
| 47 | 30.35 | 29.76 | 21.51 | 17.93 | 0.45 | 48.28 |
| 50 | 29.60 | 29.54 | 22.27 | 18.24 | 0.35 | 47.84 |
| 60 | 26.52 | 28.49 | 25.36 | 19.51 | 0.12 | 46.03 |
| 70 | 22.31 | 26.71 | 29.81 | 21.14 | 0.03 | 43.45 |
| 80 | 16.28 | 23.46 | 36.86 | 23.40 | 0.00 | 39.68 |
| 84 | 13.11 | 21.32 | 41.04 | 24.53 | 0.00 | 37.64 |

TABLE 9

| Wt % leaked | Vapor Composition wt % | | | | | |
|---|---|---|---|---|---|---|
| | R-32 | R-125 | R-134a | R-1234yf | CO2 | 32 + 1234yf |
| 0 | 37.45 | 24.97 | 4.30 | 7.14 | 26.14 | 44.59 |
| 2 | 38.01 | 25.47 | 4.43 | 7.35 | 24.74 | 45.36 |
| 10 | 39.56 | 27.07 | 5.05 | 8.15 | 20.17 | 47.71 |
| 20 | 41.76 | 29.40 | 5.85 | 9.30 | 13.69 | 51.06 |
| 30 | 43.14 | 31.32 | 6.77 | 10.43 | 8.34 | 53.57 |
| 40 | 43.48 | 32.70 | 7.84 | 11.53 | 4.45 | 55.01 |
| 45 | 43.22 | 33.18 | 8.46 | 12.08 | 3.06 | 55.30 |
| 47 | 43.04 | 33.31 | 8.73 | 12.31 | 2.61 | 55.35 |
| 50 | 42.68 | 33.50 | 9.17 | 12.64 | 2.01 | 55.32 |
| 60 | 40.66 | 33.77 | 10.96 | 13.88 | 0.73 | 54.54 |
| 70 | 37.09 | 33.53 | 13.70 | 15.50 | 0.18 | 52.59 |
| 80 | 30.85 | 32.36 | 18.71 | 18.06 | 0.02 | 48.91 |
| 84 | 26.92 | 31.24 | 22.18 | 19.65 | 0.01 | 46.57 |

Comparative Example

The same vapor leak experiment was simulated for a comparative example, R-32/125/134a/1234yf at 24.5/24.5/25.5/25.5 wt %, as above. The results for the comparative vapor phase is shown in Table 10.

TABLE 10

| %       | Vapor Composition (wt %) |       |       |         |           |
| ------- | ------------------------ | ----- | ----- | ------- | --------- |
| Leaked  | R32                      | R125  | R134a | R1234yf | 32 + 1234yf |
| 0       | 39.80                    | 30.03 | 11.90 | 18.28   | 58.08     |
| 2       | 39.52                    | 29.99 | 12.08 | 18.41   | 57.93     |
| 10      | 38.28                    | 29.85 | 12.87 | 19.00   | 57.28     |
| 20      | 36.48                    | 29.61 | 14.06 | 19.85   | 56.33     |
| 30      | 34.31                    | 29.27 | 15.54 | 20.88   | 55.19     |
| 40      | 31.63                    | 28.78 | 17.44 | 22.15   | 53.78     |
| 50      | 28.25                    | 28.01 | 19.97 | 23.77   | 52.02     |
| 60      | 23.86                    | 26.76 | 23.48 | 25.91   | 49.77     |
| 70      | 18.05                    | 24.53 | 28.60 | 28.83   | 46.88     |
| 76.8    | 13.14                    | 21.91 | 33.55 | 31.41   | 44.55     |

Results for the composition of the present invention in Table 9 are compared to the comparative example results from Table 10. Typically with vapor leaks containing only R-32/125/134a/1234yf, the composition with the highest amount of R-32 is the initial vapor phase composition. However, for the composition of the present invention, the R-32 concentration increased from the initial composition, reached a maximum concentration at about 40% leak, and then decreased, which is an unexpected behavior. And the concentration of total flammables, R-32 plus R-1234yf, was also at its highest point after about 47% leak.

In the comparative example, the highest total 32+1234yf composition is at the beginning of the leak. And the peak amount of total flammables 32+1234yf in the vapor phase is higher for the comparative composition at 58.08 wt % than for the present inventive composition of at 55.35 wt %, even though the initial amount of total R32+1234yf are the same at 50 wt %. This indicates the composition of the present invention has overall better flammability properties.

Example 7

Flammability

Flammable mixtures may be identified by testing under ASTM (American Society of Testing and Materials) E-681, with an electronic ignition source. Such tests of flammability were conducted on refrigerant mixtures at 50 percent relative humidity (determined at 23° C.) under conditions of ASTM E-681-09.

Vapor leak analysis and flammability testing has been conducted to determine whether the compositions disclosed herein meet the requirements for ASHRAE Class 1 non-flammability under ASHRAE Standard 34-2013, entitled "Designation and Safety Classification of Refrigerants." In accordance with these standards, nominal formulations for a composition are developed. Manufacturing tolerances are then assigned to account for variances in manufacturing. Compositions including the nominal formulation and compositions falling within the ranges defined by the manufacturing tolerances are analyzed in accordance with embodiments of the present invention. These compositions are set forth for a composition of the present invention in Table 11 below.

TABLE 11

| Component | Nominal Composition (Weight %) | Manufacturing Tolerances (Weight %) | Range based on Manufacturing Tolerances (Weight %) |
| --------- | ------------------------------ | ------------------------------------ | -------------------------------------------------- |
| $CO_2$    | 6                              | +2/−1                                | 5-8                                                |
| R-32      | 36                             | +2/−2                                | 34-38                                              |
| R-125     | 30                             | +2/−2                                | 28-32                                              |
| R-1234yf  | 14                             | +2/−2                                | 12-16                                              |
| R-134a    | 14                             | +2/−2                                | 12-16                                              |

After manufacturing tolerances are selected, the worst case formulation (WCF) is selected. This represents the formulation that could be most flammable based on manufacturing tolerances. The WCF is then modeled for vapor leakage of the refrigerant using NIST Refleak 3.2 at worst case conditions for several ASHRAE Standard 34 leak scenarios. Based on this modeling, the worst case fractionated formulation (WCFF) is identified, where the WCFF corresponds to the scenario in which the highest concentration of flammable components is observed in either the refrigerant liquid phase or refrigerant vapor phase, at the beginning, middle or end of the leak. For the compositions of the present invention, the WCFF was determined to be the vapor composition at −40° C. when a cylinder is initially filled to 90% full with the composition at an initial temperature of 54.4° C., then leaked 50 wt %. The WCFF composition was then tested for flammability according to ASTM E681-09 at 60° C. and 50% relative humidity, in accordance with ASHRAE 34. When ignition occurs, the flame angle for the WCFF in a spherical 12 liter flask must exhibit an arc of less than 90° in order for the composition to be considered non-flammable. Table 12 includes test results for the composition in accordance with the present invention.

TABLE 12

| $CO_2$/32/125/1234yf/134a (Weight %) | Composition Type | Highest Ignition Flame Angle | Flammable |
| ------------------------------------ | ---------------- | ---------------------------- | --------- |
| 6/36/30/14/14                        | Nominal          |                              |           |
| 5/38/28/16/13                        | WCF              |                              |           |
| 1.56/44.83/31.05/14.26/8.30          | WCFF based on WCF at −40° C., 90% fill, then leaked wt 50% | <90° | No |

As shown above, the composition of the present invention is non-flammable under ASHRAE Standard 34 guidelines.

Example 8

Cooling Performance

Cooling performance at typical conditions for air conditioning apparatus for compositions of the present invention is determined and displayed in Table 13 as compared to R-22. The GWP values are from the Intergovernmental Panel on Climate Change (IPCC) Fourth Assessment Report, Working Group I, 2007. Evaporator and condenser pressures, (Evap Pre, and Cond Pres), Average glide (average of evaporator and condenser), volumetric capacity (Cap), coefficient of performance (COP), mass flow, and Compressor discharge temperatures (Disch Temp) are calculated from physical property measurements for the compositions of the present invention at the following specific conditions:

| | |
|---|---|
| Evaporator temperature | 50° F. (10° C.) |
| Condenser temperature | 115° F. (46.1° C.) |
| Subcool liquid temperature | 8.3 K |
| Suction temperature | 11.1 K |
| Compressor efficiency | 70% |

TABLE 13

| Refrigerant (wt %) | AR4 GWP | Evap Pres Rel to R-22 (%) | Cond Pres Rel to R-22 (%) | Disch Temp (C.) | Average Glide (K) | Cap Rel to R-22 | COP Rel to R-22 | Mass Flow Rel to R-22 |
|---|---|---|---|---|---|---|---|---|
| R-22 (100) | 1810 | 100% | 100% | 84.6 | 0.0 | 100.0% | 100.0% | 100% |
| 1234yf/32/125/134a/CO$_2$ | | | | | | | | |
| 37/14/11/36/2 | 996 | 98% | 104% | 75.0 | 6.7 | 98.8% | 98.6% | 105% |
| 37.5/14/11.5/35/2 | 999 | 99% | 104% | 74.9 | 6.7 | 99.0% | 98.6% | 105% |
| 1234yf/32/125/134a | | | | | | | | |
| 37.5/14.5/11.5/36.5 | 1024 | 92% | 96% | 72.6 | 4.3 | 92.3% | 99.5% | 100% |

The data indicates that both compositions of the present invention provide close matching performance to R-22 for both cooling capacity and COP. Additionally, the GWP is less than 1000 and the average glide is within practical limits. Note that the composition without CO$_2$ has significantly lower cooling capacity and GWP greater than 1000. These compositions are also estimated to be non-flammable.

What is claimed is:

1. A composition comprising a refrigerant consisting essentially of from about 13 to 15 weight percent difluoromethane, about 10 to 12 weight percent pentafluoroethane, about 36 to 38 weight percent 2,3,3,3-tetrafluoropropene, about 34 to 37 weight percent 1,1,1,2-tetrafluoroethane, and about 1 to 3 weight percent carbon dioxide.

2. The composition of claim 1, wherein said refrigerant consists essentially of about 14 weight percent difluoromethane, about 11 weight percent pentafluoroethane, about 37 weight percent 2,3,3,3-tetrafluoropropene, about 36 weight percent 1,1,1,2-tetrafluoroethane, and about 2 weight percent carbon dioxide.

3. The composition of claim 1, wherein said refrigerant consists essentially of about 14 weight percent difluoromethane, about 11.5 weight percent pentafluoroethane, about 37.5 weight percent 2,3,3,3-tetrafluoropropene, about 35 weight percent 1,1,1,2-tetrafluoroethane, and about 2 weight percent carbon dioxide.

4. The composition of claim 1, further comprising one or more components selected from the group consisting of lubricants, dyes, solubilizing agents, compatibilizers, stabilizers, tracers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof.

5. The composition of claim 4, wherein said lubricant is selected from the group consisting of mineral oil, alkylbenzene, polyol esters, polyalkylene glycols, polyvinyl ethers, polycarbonates, perfluoropolyethers, synthetic paraffins, synthetic napthenes, polyalpha-olefins, and combinations thereof.

6. The composition of claim 4, wherein said stabilizer is at least one selected from the group consisting of tocopherol; hydroquinone; t-butyl hydroquinone; monothiophosphates; dithiophosphates; dialkylthiophosphate esters; butylated triphenylphosphorothionates; amine phosphates; hindered phosphites; tris-(di-tert-butylphenyl)phosphite; di-n-octyl phosphite; iso-decyl diphenyl phosphite; trimethyl phosphate; triethylphosphate; tributyl phosphate; trioctyl phosphate; tri(2-ethylhexyl)phosphate; triaryl phosphates; triphenyl phosphate; tricresyl phosphate; trixylenyl phosphate; isopropylphenyl phosphate (IPPP); bis(t-butylphenyl)phenyl phosphate (TBPP); butylated triphenyl phosphates; tert-butylated triphenyl phosphates; isopropylated triphenyl phosphates; anisole; 1,4-dimethoxybenzene; 1,4-diethoxybenzene; 1,3,5-trimethoxybenzene; myrcene, alloocimene, limonene; d-limonene; retinal; α-pinene; β-pinene; menthol; geraniol; farnesol; phytol; Vitamin A; α-terpinene; γ-terminene; delta-3-carene; terpinolene; phellandrene; fenchene; dipentene; carotenoids; lycopene; beta carotene; xanthophylls; zeaxanthin; retinoids; hepaxanthin; isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane; 3-ethyl-3-((phenoxy)methyl)-oxetane; 3-ethyl-3-((2-ethylhexyloxy)methyl)-oxetane; ascorbic acid; methanethiol; ethanethiol; Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanylpropanoic acid); lipoamide (1,2-dithiolane-3-pentanamide); 5,7-bis(1,1-dimethylethyl)-3-[2,3(or 3,4)-dimethylphenyl]-2(3H)-benzofuranone; benzyl phenyl sulfide; diphenyl sulfide; diisopropylamine; dioctadecyl 3,3'-thiodipropionate; didodecyl 3,3'-thiopropionate; di-(2,2,6,6-tetramethyl-4-piperidyl)sebacate; poly-(N-hydroxyethyl-2,2,6,6-tetramethyl-4-hydroxy-piperidyl succinate; methyl bis tallow amine; bis tallow amine; phenol-alpha-naphthylamine; bis (dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

7. A process for producing cooling comprising condensing the composition of claim 1 and thereafter evaporating said composition in the vicinity of a body to be cooled.

8. A process for producing heating comprising evaporating the composition of claim 1 and thereafter condensing said composition in the vicinity of a body to be heated.

9. A method of replacing R-22 in refrigeration, air conditioning or heat pump systems comprising providing the composition of claim 1 as replacement for said R-22.

10. An air conditioning or heat pump system containing the composition of claim 1.

11. The air conditioning or heat pump system of claim 10, comprising an evaporator, compressor, condenser and expansion device.

12. The air conditioning or heat pump system of claim 10, wherein said system includes one or more heat exchangers that operate in counter-current mode or cross-current mode with counter-current tendency.

13. A refrigeration system containing the composition of claim 1.

14. The refrigeration system of claim 13 comprising an evaporator, compressor, condenser and expansion device.

15. The refrigeration system of claim 13, wherein said system includes one or more heat exchangers that operate in counter-current mode or cross-current mode with counter-current tendency.

* * * * *